United States Patent
Yang et al.

(10) Patent No.: US 11,963,111 B2
(45) Date of Patent: Apr. 16, 2024

(54) LOW COMPLEXITY PRECODER

(71) Applicant: Nokia Solutions and Networks Oy, Espoo (FI)

(72) Inventors: Hong Yang, Ledgewood, NJ (US); Carl Nuzman, Union, NJ (US); Paschalis Tsiaflakis, Heist-op-den-Berg (BE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/237,025

(22) Filed: Aug. 23, 2023

(65) Prior Publication Data

US 2024/0089874 A1  Mar. 14, 2024

(30) Foreign Application Priority Data

Aug. 24, 2022 (FI) .................................... 20225745

(51) Int. Cl.
*H04W 52/42* (2009.01)
*H04B 7/0456* (2017.01)
*H04W 52/34* (2009.01)

(52) U.S. Cl.
CPC .......... *H04W 52/42* (2013.01); *H04B 7/0456* (2013.01); *H04W 52/34* (2013.01)

(58) Field of Classification Search
None
See application file for complete search history.

(56) References Cited

U.S. PATENT DOCUMENTS

2013/0267266 A1* 10/2013 Park .................. H04B 7/0456
  455/501
2022/0103212 A1* 3/2022 Guo .................. H04B 7/0456
2022/0239350 A1* 7/2022 Jacobsson ............ H04B 7/0617

FOREIGN PATENT DOCUMENTS

| WO | WO 2017/003963 A1 | 1/2017 |
| WO | WO 2021/238634 A1 | 12/2021 |
| WO | WO 2022/124956 A1 | 6/2022 |

OTHER PUBLICATIONS

Yang, L. et al., "A Near-Optimal Iterative Linear Precoding with Low Complexity for Massive MIMO Systems," IEEE Communications Letters. vol. 23 No. 6, Jun. 2019, pp. 1105-1108.

* cited by examiner

*Primary Examiner* — Jutai Kao
(74) *Attorney, Agent, or Firm* — Harrington & Smith

(57) ABSTRACT

An apparatus is disclosed, which may include: at least one processor; and at least one memory storing instructions that, when executed by the at least one processor, cause the apparatus at least to perform: receiving downlink channel estimates between a plurality of access point (AP) antennas of one or more APs and a plurality of user equipment (UE) antennas of one or more UEs; iteratively updating a set of power allocation weights for the AP antennas using weights extracted from a precoder; computing the precoder based on the received channel estimates and a previous set of power allocation weights; performing the iterative updates until a stopping criterion is reached; and outputting data representative of a precoder computed from the received channel estimates and the updated set of power allocation weights.

18 Claims, 11 Drawing Sheets

LOW COMPLEXITY PRECODER

FIELD

Example embodiments may relate to systems, methods and/or computer programs for performing low complexity precoding for downlink transmissions from a plurality of access point antennas to one or more user equipment.

BACKGROUND

Massive multiple-input multiple output (mMIMO) is a key physical layer wireless technology for 5G communication standards and beyond. In the downlink, precoding schemes for mMIMO that eliminate or suppress interference, such as zero-forcing or regularized zero-forcing schemes, can allow simultaneous communication to multiple users over shared frequency resources with high spectral efficiency. In wireless environments with rich scattering, these precoding schemes generally result in homogenous power profiles, meaning that the transmitted signal on each transmit chain has approximately the same power level (i.e., substantially uniform transmit power over transmit chains). However, in many other wireless environments commonly encountered in practice, these precoding schemes lead to heterogeneous power profiles in which the transmitted signals on different transmit chains can have very different power levels. To comply with maximum power constraints per transmit chain, it is then necessary to apply a common power backoff to all transmit chains, determined by the power of the worst-case transmit chain. This power backoff causes a reduction in communication range that is proportional to the heterogeneity in power profile. The heterogeneity in power profile is even more pronounced in the case of distributed mMIMO, which employs a collection of geographically separated access points (APs) each with a plurality of AP antennas that jointly serve multiple user equipment (UEs), each UE having one or more UE antennas. Because the transmit AP antennas are geographically separated, power profiles for distributed mMIMO are even more heterogeneous, and using traditional ZF precoding is far from optimal.

It is known that high complexity zero-forcing precoding algorithms using, for example, second-order cone programming can design precoders that suppress interference between users and have a homogeneous power profile. These algorithms could in principle allow a mMIMO system to avoid the range reduction associated with heterogeneous power profiles, but they are too complex to use in practice. For practical implementation, there is a desire for a low-complexity zero-forcing precoding algorithm that can approach the performance of these high-complexity approaches.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is described an apparatus comprising: at least one processor; and at least one memory storing instructions that, when executed by the at least one processor, cause the apparatus to at least perform operations comprising: receiving downlink channel estimates between a plurality of access point (AP) antennas of one or more APs and a plurality of user equipment (UE) antennas of one or more UEs of a communication system; iteratively updating a set of power allocation weights for the AP antennas using an estimated power allocation associated with each AP antenna extracted from a precoder, the precoder computed based on the received channel estimates and a previous set of power allocation weights, until a stopping criterion is reached; and outputting data representative of a precoder computed from the received channel estimates and the updated set of power allocation weights.

In some example embodiments, the apparatus further caused to perform operations comprising: applying the data representative of the output precoder for precoding communication data for transmission to one or more UE via one or more of the AP antennas; and transmitting the precoded communication data to one or more corresponding access points, APs, for transmission to the one or more UE via the corresponding AP antennas.

In some example embodiments, the apparatus further caused to perform operations comprising: transmitting, to each AP, data representative of precoder information associated with the AP antennas of said each AP extracted from the data representative of the output precoder, wherein said each AP is configured to apply the corresponding precoder information for precoding communication data for transmission via the corresponding AP antennas of said each AP to one or more corresponding UE antennas associated with one or more UEs.

In some example embodiments, iteratively updating further comprising: for each of one or more iterations, computing a precoder based on the set of power allocation weights and the received channel estimates; extracting an estimated power allocation associated with each AP antenna from the computed precoder; and updating the set of power allocation weights for the AP antennas based on applying the estimated power allocation associated with each AP antenna to the corresponding power allocation weight for that AP antenna from the set of power allocation weights.

In some example embodiments, updating the set of power allocation weights for the AP antennas further comprising: updating, for each of the AP antennas, the corresponding power allocation weight of said each AP antenna from the set of power allocation weights based on multiplying the corresponding power allocation weight by the inverse of the square root of the estimated power allocation of said AP antenna.

In some example embodiments, the estimated power allocation associated with each AP antenna is the square of a norm of the corresponding row of a precoder matrix of the precoder.

In some example embodiments, determining whether the stopping criterion is reached is based on at least one of: a maximum number of iterations is reached; when an improvement in a maximum estimated power allocation over all AP antennas is below a power threshold; determining convergence of each power allocation weight of the updated set of power allocations; determining whether a difference between each power allocation weight of the updated set of power allocation weights and the corresponding power allocation weight of the previous set of power allocation weights meets one or more thresholds.

In some example embodiments, the precoder comprises at least one from the group of: a zero-forcing precoder; a regularized zero-forcing precoder; a minimum mean squared error precoder; any other suitable multiple-input multiple-output based precoder; and/or combinations thereof, modifications thereto.

In some example embodiments, the set of power allocation weights is an M dimensional vector $w=(w_1, \ldots, w_M)^T \in \mathbb{R}_+^{M \times 1}$, where M is the number of AP antennas of one or more APs, the downlink received channel estimates between the M AP antennas and a number of K UE antennas of one or more UEs is represented by $G \in \mathbb{C}^{M \times K}$ and iteratively updating the set of power allocation weights, w, further comprising:

initializing the set of power allocation weights, w, to an initial set of power allocation weights, $w_0 \in \mathbb{R}_+^M$;

for each of one or more iterations, $1 \leq n \leq N$, where N is a maximum number of iterations, updating the n-th set of power allocation weights by computing $w_n = \Omega(w_{n-1})$, where:

$$\Omega(w_{n-1}) = \left( \frac{w_1[n-1]}{\|\bar{q}_1(w_{n-1})\|_2}, \ldots, \frac{w_M[n-1]}{\|\bar{q}_M(w_{n-1})\|_2} \right)^T,$$

and where the (n-1)-th power allocation weights are denoted $w_{n-1}=(w_1[n-1], \ldots, w_m[n-1])^T \in \mathbb{R}_+^{M \times 1}$, $w_m[n-1] \in \mathbb{R}_+$ is the m-th weight of the (n-1)-th set of power allocation weights, $w_{n-1}$, and the (n-1)-th extracted estimated power allocation for the m-th AP antenna is the square of $\|\bar{q}_m(w_{n-1})\|_2$, where $\bar{q}_m(w_{n-1})$ is the mth row of a precoder matrix, $Q(w_{n-1}) \in \mathbb{C}^{M \times K}$ for $1 \leq m \leq M$, which is computed based on the downlink received channel estimates, G, and the (n-1)-th set of power allocation weights, $w_{n-1}$.

In some example embodiments, outputting data representative of a precoder further comprising outputting data representative of a precoder based on at least one of:

a precoding matrix of $Q(w_n)$, where $n \leq N$ is the final iteration;

a precoding matrix of $Q(w_{n-1})$, where $n \leq N$ is the final iteration; and a precoding matrix of $Q(w_i)$, where $w_i$ is the i-th set of power allocation weights for the i-th iteration, $1 \leq i \leq N$, that results in a dominant power allocation closest to a power level threshold for the plurality of AP antennas.

In some example embodiments, outputting data representative of the precoder further comprising outputting data representative of a ZF precoder based on $Q(w)=WG^*(G^TWG^*)^{-1}$, where $W \in \mathbb{R}_+^{M \times M}$ is a diagonal matrix with the elements of w on the diagonal.

In some example embodiments, initializing the set of power allocation weights, w, further comprising performing at least one of:

initializing the set of power allocation weights, w, to an initial set of power allocation weights, $w_0=(1, \ldots, 1)^T$ or $w_m[0]=1$ for $1 \leq m \leq M$;

initializing the set of power allocation weights, w, to an initial set of power allocation weights, $w_0=[w_n]_i$, where $[w_n]_i$ is an n-th updated set of power allocation weights, $w_n$, from a previous i-th set of iterations;

initializing the set of power allocation weights, w, to an initial set of power allocation weights, $w_0$, where $w_m[0]=1/\|\bar{g}_m\|_2$ for $1 \leq m \leq M$, and $\bar{g}_m$ is the m-th row of the channel matrix G;

In some example embodiments, the communication system is an orthogonal frequency division multiplexing, OFDM, system, the OFDM system comprising a set of subcarriers, and where iteratively updating the set of power allocation weights and outputting further comprising:

iteratively updating the set of power allocation weights of the AP antennas for each subcarrier in the set of subcarriers using estimated power allocations extracted from a precoder computed for each subcarrier in the set of subcarriers, wherein the precoder for each subcarrier in the set of subcarriers is computed based on the received channel estimates for each subcarrier in the set of subcarriers and the previous corresponding set of power allocation weights of the AP antennas for each subcarrier in the set of subcarriers; and outputting data representative of a precoder for each subcarrier in the set of subcarriers, each precoder for each subcarrier in the set of subcarriers computed from the received channel estimates of each subcarrier in the set of subcarriers and the updated set of power allocation weights of each AP antenna associated with each subcarrier in the set of subcarriers.

In some example embodiments, iteratively updating the set of power allocation weights of the AP antennas associated with a first and a second subcarrier in the set of subcarriers further comprising computing the precoder for the first subcarrier in the set of subcarriers and the second subcarrier in the set of subcarriers, wherein the set of power allocation weights of the AP antennas for the second subcarrier are initialised based on the precoder computed for the first subcarrier in the set of subcarriers.

In some example embodiments, iteratively updating the set of power allocation weights of the AP antennas associated with each subcarrier in the set of subcarriers further comprising computing the precoder for each of the subcarriers in the set of subcarriers successively in order of increasing or decreasing subcarrier index, wherein the set of power allocation weights of the AP antennas for subcarrier index 1 is $w_n^{(l)}$ and initialising the set of power allocation weights of the AP antennas for subcarrier index 1 to $w_0^{(l)}=w_n^{(l-1)}$ when successively computing precoders for increasing subcarrier index or to $w_0^{(l)}=w_n^{(l+1)}$ when successively computing precoders for decreasing subcarrier index.

In some example embodiments, one or more of a plurality of AP antennas of the one or more APs have different power constraints, and the set of power allocation weights is an M dimensional vector $w=(w_1, \ldots, w_m)^T \in \mathbb{R}_+^{M \times 1}$, where M is the number of AP antennas, the downlink received channel estimates between the M AP antennas and a number of K UE antennas of one or more UEs represented by $G \in \mathbb{C}^{M \times K}$ and iteratively updating the set of power allocation weights, w, further comprising:

initializing the set of power allocation weights, w, to an initial set of power allocation weights, $w_0 \in \mathbb{R}_+^M$;

for each of one or more iterations, $1 \leq n \leq N$, where N is a maximum number of iterations, updating the n-th set of power allocation weights, $w_n$, by computing $w_n = \Omega(w_{n-1})$, where:

$$\Omega(w_{n-1}) = \left( \frac{P_1 w_1[n-1]}{\|\bar{q}_1(w_{n-1})\|_2}, \ldots, \frac{P_M w_M[n-1]}{\|\bar{q}_M(w_{n-1})\|_2} \right)^T,$$

and where the (n-1)-th power allocation weights are denoted $w_{n-1}=(w_1[n-1], \ldots, w_M[n-1])^T \in \mathbb{R}_+^{M \times 1}$, $w_m[n-1] \in \mathbb{R}_+$ is the m-th weight of the (n-1)-th set of power allocation weights, $w_{n-1}$, $P_m^2$ is the power constraint on the m-th transmit chain, and the (n-1)-th extracted estimated power allocation for the m-th AP antenna is the square of $\|\bar{q}_m(w_{n-1})\|_2$, where $\underline{q}_m(w_{n-1})$ is the mth row of the precoder, $Q(w_{n-1}) \in \mathbb{C}^{M \times K}$ for $1 \le m \le M$, which is computed based on the downlink received channel estimates, G, and the (n-1)-th set of power allocation weights, $w_{n-1}$.

In some example embodiments, the communication system is an OFDM system with a set of subcarriers S, one or more of a plurality of AP antennas of the one or more APs have different power constraints, and the set of power allocation weights is an M dimensional vector $w=(w_1, \ldots, w_M)^T \in \mathbb{R}_+^M$, where M is the number of AP antennas of the one or more APs, the downlink received channel estimates for each subcarrier $l \in S$ between the M AP antennas and a number of K UE antennas of one or more UEs is represented by $G^{(l)} \in \mathbb{C}^{M \times K}$, and iteratively updating the set of power allocation weights, w, further comprising:

initializing the set of power allocation weights, w, to an initial set of power allocation weights, $w_0 \in \mathbb{R}_+^M$;

for each of one or more iterations, $1 \le n \le N$, where N is a maximum number of iterations, updating the n-th set of power allocation weights, $w_n$, by computing $w_n = \Omega_S(w_{n-1})$, where:

$$\Omega_S(w_{n-1}) = \left( \frac{P_1 w_1[n-1]}{r_1(w_{n-1})}, \ldots, \frac{P_M w_M[n-1]}{r_M(w_{n-1})} \right)^T,$$

and
where the (n-1)-th power allocation weights are denoted $w_{n-1} = (w_1[n-1], \ldots, w_M[n-1])^T \in \mathbb{R}_+^{M \times 1}$, $w_m[n-1] \in \mathbb{R}_+$ the m-th weight of the (n-1)-th set of power allocation weights, $w_{n-1}$, $P_m^2$ is the power constraint on the m-th transmit chain, and $$r_m(w_{n-1}) = \sqrt{\sum_{l \in S} \left\| q_m^{(l)}(w_{n-1}) \right\|_2^2}$$

is the square root of the total transmit power for AP antenna m incorporating contributions for all subcarriers $l \in S$, where $q_m^{(l)}(w_{n-1})$ is the mth row of the precoder matrix $Q^{(l)}(w)$ for subcarrier $l \in S$; and outputting for each subcarrier in the set of subcarriers data representative of a precoder matrix based on $Q^{(l)}(w_n)$ or $Q^{(l)}(w_{n-1})$ for each $l \in S$.

In some example embodiments, the plurality of AP antennas of the one or more APs are part of a cell-free massive multi-input multiple-output communication network; or the plurality of AP antennas of the one or more APs are part of a cellular communication network.

According to a second aspect, there is described a computer-implemented method comprising: receiving downlink channel estimates between a plurality of access point, AP, antennas of one or more APs and a plurality of user equipment, UE, antennas of one or more UEs of a communication system; iteratively updating a set of power allocation weights for the AP antennas using an estimated power allocation associated with each AP antenna extracted from a precoder, the precoder computed based on the received channel estimates and a previous set of power allocation weights, until a stopping criterion is reached; and outputting data representative of a precoder computed from the received channel estimates and the updated set of power allocation weights.

In some embodiments, the computer-implemented method of the second aspect further comprising one or more operations, steps, features and/or aspects according to the first aspect of any preceding apparatus definition.

According to a third aspect, there is described an apparatus, comprising means for: receiving downlink channel estimates between a plurality of access point, AP, antennas of one or more APs and a plurality of user equipment, UE, antennas of one or more UEs of a communication system; iteratively updating a set of power allocation weights for the AP antennas using an estimated power allocation associated with each AP antenna extracted from a precoder, the precoder computed based on the received channel estimates and a previous set of power allocation weights, until a stopping criterion is reached; and outputting data representative of a precoder computed from the received channel estimates and the updated set of power allocation weights.

In some embodiments, the apparatus of the second aspect further comprising one or more operations, steps, features and/or aspects according to the first aspect of any preceding apparatus definition.

According to a fourth aspect, there is provided a computer program product comprising a set of instructions which, when executed on an apparatus, is configured to cause the apparatus to carry out the computer-implemented method of any preceding method definition.

According to a fifth aspect, there is provided a non-transitory computer readable medium comprising program instructions stored thereon for performing a method, comprising: receiving downlink channel estimates between a plurality of access point, AP, antennas of one or more APs and a plurality of user equipment, UE, antennas of one or more UEs of a communication system; iteratively updating a set of power allocation weights for the AP antennas using an estimated power allocation associated with each AP antenna extracted from a precoder, the precoder computed based on the received channel estimates and a previous set of power allocation weights, until a stopping criterion is reached; and outputting data representative of a precoder computed from the received channel estimates and the updated set of power allocation weights.

The program instructions of the fifth aspect may also perform operations, steps, functionality according to any preceding method or apparatus definition of the first, second, third or fourth aspects.

In a sixth aspect, this specification describes a computer-readable medium (such as a non-transitory computer-readable medium) comprising program instructions stored thereon for performing (at least) any preceding method or apparatus definition as described with reference to any of the first, second, third, fourth, and/or fifth aspects.

BRIEF DESCRIPTION OF THE DRAWINGS

Example embodiments will now be described by way of non-limiting example, with reference to the accompanying drawings, in which.

DETAILED DESCRIPTION

Figure 1A:
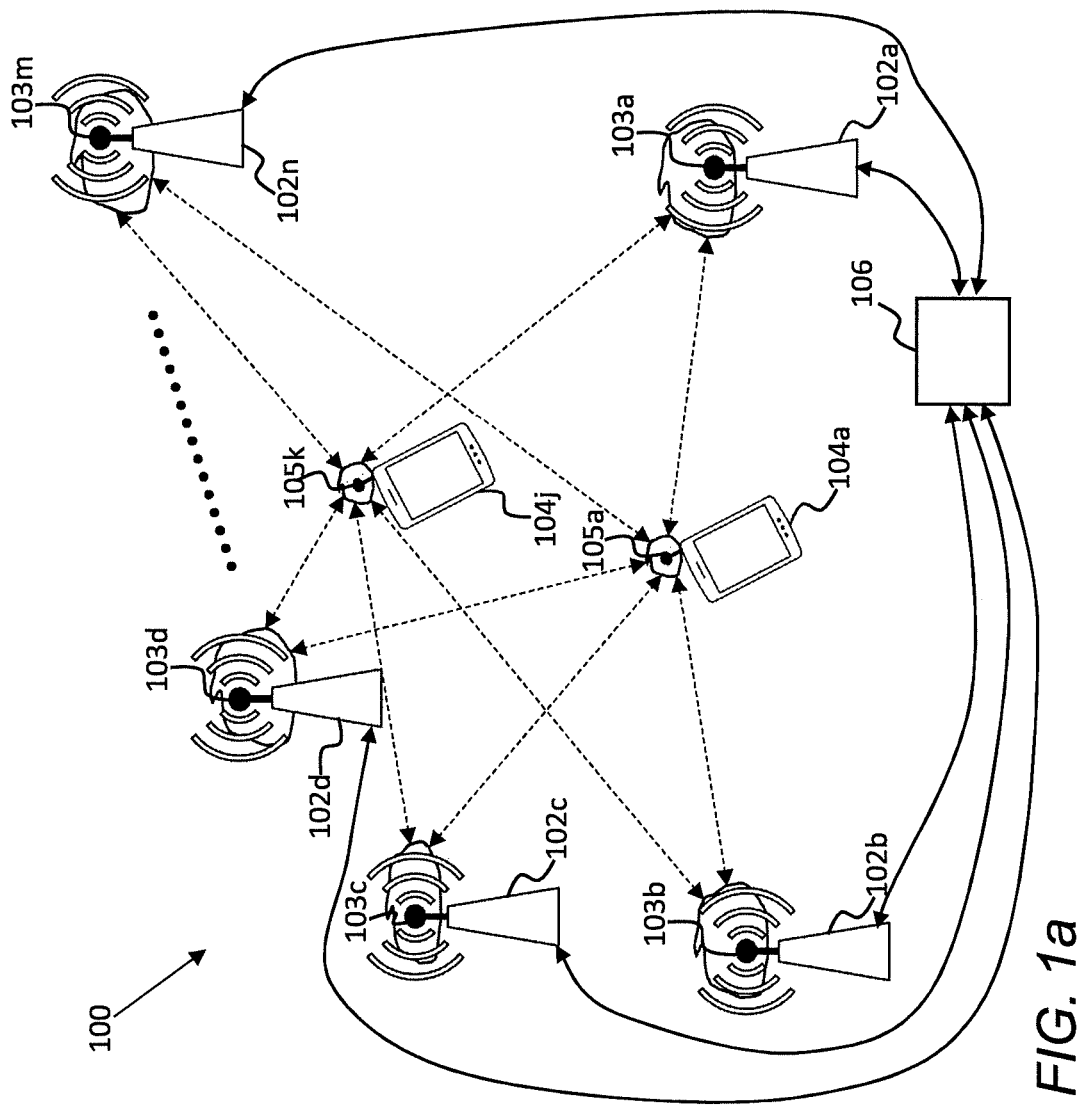
FIG. 1a is a schematic view of an example cell-free massive multi-input multi-output communication system useful for understanding example embodiments.

The scope of protection sought for various embodiments of the invention is set out by the claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1a is a block diagram of a cell-free massive multiple-input multiple-output (mMIMO) wireless communication system 100. The mMIMO employs a collection of geographically separated access points (APs) 102a-102n to jointly serve multiple user equipment (UEs) 104a-104j. The mMIMO system 100 comprises a plurality of APs 102a-102n and a plurality of AP antennas 103a-103m. Each of the APs 102a-102n may include one or more of the plurality of AP antennas 103a-103m. For example an AP 102a may include a set or group of AP antennas of the plurality of AP antennas 103a-103m, or multiple AP antennas of the plurality of AP antennas 103a-103m or even a single AP antenna from the plurality of AP antennas 103a-103m. In addition, each of the UEs 104a-104j may have one or more of a plurality of UE antennas 105a-105k. For example a UE 104a may include a set or group of UE antennas of the plurality of UE antennas 105a-105k, or multiple UE antennas of the plurality of UE antennas 105a-105k or even a single UE antenna from the plurality of UE antennas 105a-105k. In this example, for simplicity, each AP 102a-102n has a corresponding AP antenna 103a-103m, and each UE 104a-104j has a corresponding single UE antenna 105a-105k. The APs 102a-102n communicate via their corresponding AP antennas 103a-103m over wireless communication channels with the corresponding UE antennas 105a-105k of the one or more UEs 104a-104j.

In this example, the mMIMO system 100 is "cell-free" because it does not divide coverage area into cells as in a traditional cellular system, rather, the entire coverage area is served by a number M of the plurality of AP antennas 103a-103m, where M>1. There may be a number K of UE antennas 105a-105k, which in this example means there also are K UEs 104a-104j that are served simultaneously by the M AP antennas 103a-103m. Typically M»K. In this case, in the downlink, each of the K UE antennas 105a-105k of the UEs 104a-104j receives communication data from the M AP antennas 103a-103m over M corresponding communication channels for each of the K UE antennas 105a-105k. For example, the APs 102a-102n are configured to jointly beamform the communication data to the multiple UEs 104a-104j using the same communications resource (e.g. time-frequency resource). In this example, all the APs 102a-102n are connected to a network element 106.

The network element 106 may be configured to receiving communication data for transmission over the downlink channels to each of the UEs 104a-104j. Prior to downlink transmission, the network element 106 may be further configured to pre-process the communication data for each UE for, without limitation, for example precoding and/or power control coordination for the beamforming. The pre-processed communication data is sent to each of the APs 102a-102n for beamforming and transmitting, via their corresponding AP antennas 103a-103m to the corresponding UE antennas 105a-105k of one or more of the UEs 104a-104j that are meant to receive the communication data. The precoding may use MIMO processing techniques to minimize or suppress interference between the communication data transmitted to each UE 104a and the communication data transmitted to each other UE 104b of the MIMO system 100. The MIMO processing techniques may include, without limitation, for example interference suppression precoding, zero-forcing (ZF) precoding, minimum mean squared error (MMSE) precoding, or optimal linear precoding or any other suitable MIMO precoding technique and the like. Alternatively or additionally, each of the APs 102a-102n may include some or at least all of the functionality of network element 106 for pre-processing the corresponding communication data for UEs 104a-104j that are served by that AP.

Figure 1B:
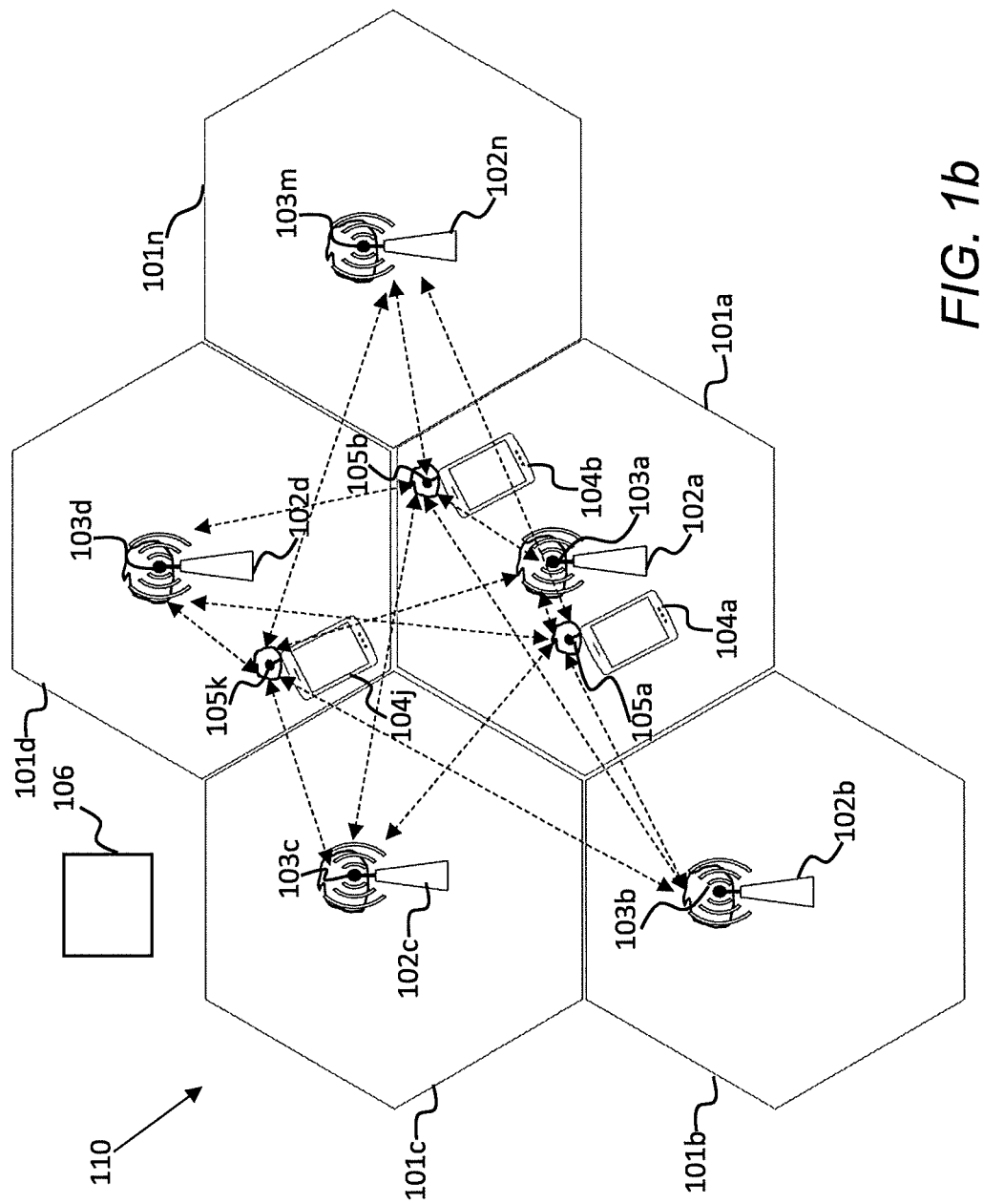
FIG. 1b is a schematic view of an example cellular communication system useful for understanding example embodiments.

FIG. 1b is a block diagram of a cellular MIMO communication system 110. The MIMO system 110 comprises one or more APs 102a-102n serving a corresponding plurality of cells 101a-101n and a plurality of AP antennas 103a-103m. Each AP 102a of the one or more APs 102a-102n may include one or more of the plurality of AP antennas 103a-103m. For example, an AP 102a may include a group of the plurality of AP antennas 103a-103m, multiple AP antennas of the plurality of AP antennas 103a-103m or a single AP antenna of the plurality of AP antennas 103a-103m. In this example, each AP 102a-102n has a corresponding AP antenna 103a-103m. Each AP 102a of the one or more APs 102a-102n serves a particular cell 101a of the plurality of cells 101a-101n and hence primarily communicates with UEs 104a or 104b located within the particular cell 101a. The AP 102a may communicate with UE 104j in other cell 101d during cell handover and the like as UE 104j moves from coverage of cell 101d into coverage of cell 101a. The one or more APs 102a-102n communicate via their corresponding AP antennas 103a-103m over communication channels with one or more UEs 104a-104j within their cells 101a-101n.

In this example, the MIMO system 100 is a cellular system because the coverage area is divided into cells 101a-101n. Although an AP 102a only serves UEs 104a-104b within the cell 101a, transmissions from other APs 102b-102n to other UEs 104j in adjacent cells 101b-101n may be received by UEs 104a-104b in cell 101a. In essence, each UE 104*a*-104*j* may each be subject to transmissions from a number M of the plurality of AP antennas 103*a*-103*m*, where M>1. There may be a number K UE antennas 105*a*-105*k* for the UEs 104*a*-104*j*, which are served by APs 102*a* or 102*d* and which receive interference transmissions from some of the M AP antennas 103*a*-103*m* from other cells 101*b*-101*n*. Typically M»K. In this case, each of the UEs 104*a*-104*b* receives via the corresponding UE antennas 105*a*-105*b* communication data from the AP antennas 103*a* of AP 102*a* over corresponding communication channels, but also may receive transmissions from other APs 102*b*-102*n* to other UEs 104*c* in other cells 101*b*-101*n* from the other AP antennas 103*b*-103*m* as interference. In this example, each of the APs 102*a*-102*n* may be connected to a network element 106. Alternatively or additionally, the functionality of network element 106 may be a component of each of the APs 102*a*-102*n* or one or more of the APs 102*a*-102*n*.

The network element 106 may be configured to receive communication data for each of the UEs 104*a*-104*j*. The network element 106 may be further configured to pre-process the communication data for each UE for, without limitation, for example precoding and/or power control coordination. For example, the precoding may be based on MIMO techniques as described with reference to FIG. 1*a*. The pre-processed communication data is sent to each of the APs 102*a*-102*n* for transmitting, via the corresponding AP antennas 103*a*-103*m*, to each of the UEs 104*a*-104*j*, via their corresponding UE antennas 105*a*-105*k*, that are meant to receive the communication data. The pre-coding may use MIMO processing techniques to minimize or suppress interference between the communication data transmitted to one UE 104*a* and the communication data transmitted to other UEs 104*b*-104*j* of the MIMO system 110. Alternatively or additionally, each of the APs 102*a*-102*n* may include some or at least all of the functionality of network element 106 for pre-processing the communication data for UEs 104*a*-104*b* that are served by that AP 102*a*.

Figure 1C:
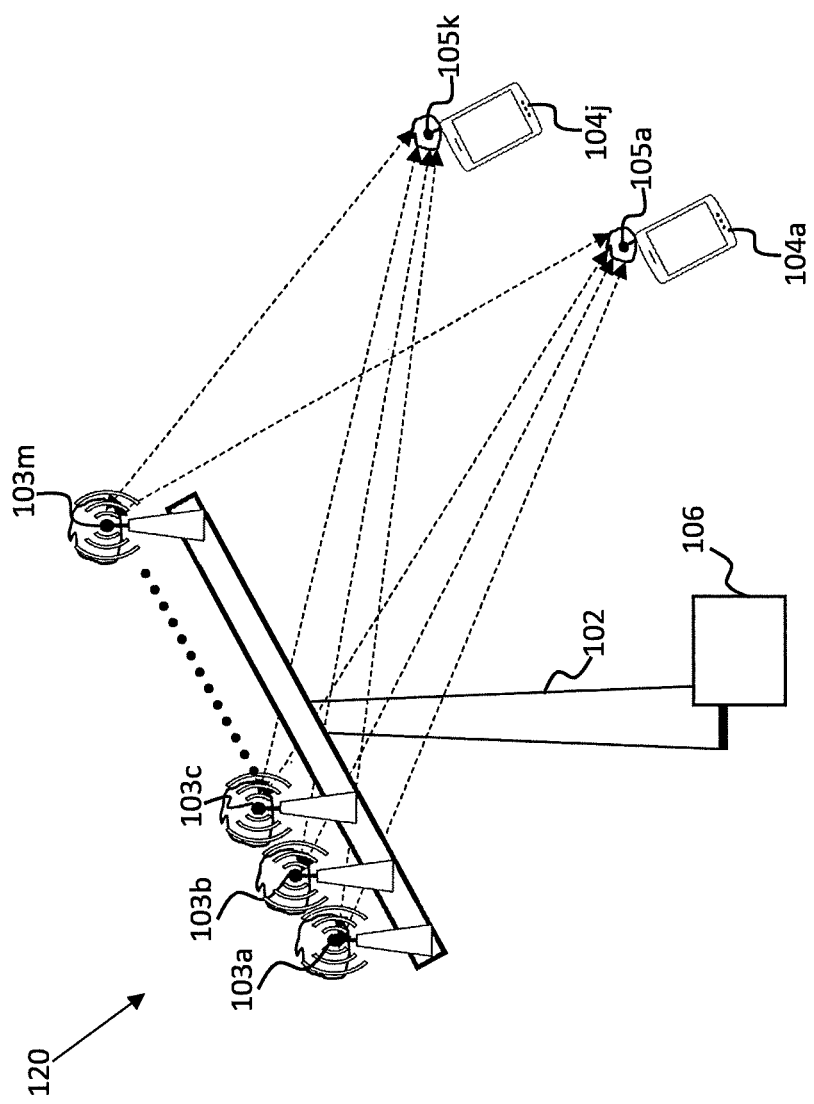
FIG. 1c is a schematic view of an example multi-antenna access point for a communication system useful for understanding example embodiments.

FIG. 1*c* is a block diagram of a MIMO communication system 120. The MIMO system 120 includes an AP 102 with a plurality of AP antennas 103*a*-103*m* serving UEs 104*a*-104*j* with a plurality of UE antennas 105*a*-105*k*. The AP 102 may communicate with UEs 104*a* to 104*j* via the plurality of AP antennas 103*a*-103*m* over corresponding wireless communication channels with the UEs 104*a*-104*j*. In this example, each of the UEs 104*a*-104*j* may have one or more of a plurality of UE antennas 105*a*-105*k*. For example a UE 104*a* may include a set or group of UE antennas of the plurality of UE antennas 105*a*-105*k*, or multiple UE antennas of the plurality of UE antennas 105*a*-105*k* or even a single UE antenna from the plurality of UE antennas 105*a*-105*k*. In this example, for simplicity, each of the UEs 104*a*-104*j* may have a corresponding single UE antenna 105*a*-105*k*. In this example, a number of K UE antennas 105*a*-105*k* of each UE 104*a*-104*j* are subject to receive transmissions from a number M of the plurality of AP antennas 103*a*-103*m*, where M>1. When each UE has a single UE antenna, then there may be a number K of UEs 104*a*-104*j* that simultaneously receive communication data transmitted from the M antennas 103*a*-103*m* to one or more of those UEs 104*a*-104*j* meant to receive the communications data. Typically M»K. Each of the UE antennas 105*a*-105*k* of the UEs 104*a*-104*j* receives corresponding communication data from the M AP antennas 103*a*-103*m* of AP 102 over corresponding communication channels.

In this example, the AP 102 is connected to network element 106, which may be configured for receiving communication data for each of the UEs 104*a*-104*j* and pre-processing the communication data for each UE as described with reference to FIG. 1*a*. The pre-processing may include, without limitation, for example precoding and/or power control coordination. The pre-processed communication data is transmitted by corresponding AP antennas 103*a*-103*m* to each of the UEs 104*a*-104*j* that are meant to receive the communication data. The pre-coding may use MIMO processing techniques to minimize or suppress interference between the communication data transmitted to one UE 104*a* and the communication data transmitted to other UEs 104*j* of the MIMO system 120. For example, some of the MIMO techniques described with reference to FIG. 1*a* may be applied. The AP 102 with M AP antennas 103*a*-103*m* of FIG. 1*c* may be used for each of the plurality of APs in any of the mMIMO or MIMO systems 100 or 110 of FIG. 1*a* or 1*b* and the like.

For either mMIMO system 100, MIMO system 110, or MIMO system 120 of FIGS. 1*a*, 1*b* and 1*c*, each of the K UE antennas 105*a*-105*k* of the UEs 104*a*-104*j* receive communication data (which may include interference from other users) from at least the M AP antennas 103*a*-103*m* of the corresponding one or more APs 102*a*-102*n*. The one or more APs may be connected to network element 106 or include functionality of network element 106 for precoding processing and/or for power control coordination/allocation. For MIMO processing, the network element 106 may operate on the channel estimates between the M AP antennas 103*a*-103*m* of the one or more APs 102*a*-102*n* and the corresponding K UE antennas 105*a*-105*k* of the UEs 104*a*-104*j*. In these examples, each UE includes a single UE antenna, so there are K UE antennas. Although each UE is described as having a single UE antenna, this is by way of example only, it is to be appreciated by the skilled person that each UE may have one or more UE antennas, or a plurality of UE antennas, where the following MIMO techniques, methods, processes and/or apparatus may be modified accordingly.

For the mMIMO, cellular MIMO and MIMO systems 110, 110, and/or 120 of FIGS. 1*a* to 1*c*, the channel matrix between the MAP antennas of one or more APs and the K UE antennas of one or more UEs may be, denoted G, and can be represented by:

$$G = (g_1 \ \ldots \ g_K) = \begin{pmatrix} \bar{g}_1^T \\ \vdots \\ \bar{g}_M^T \end{pmatrix} \in \mathbb{C}^{M \times K}$$

where, G is an M×K channel matrix of complex channel estimates between the M AP antennas and the K UE antennas, $g_k \in \mathbb{C}^{M \times 1}$ is an M×1 channel vector of complex channel estimates between the M antennas and the k-th UE antenna, for $1 \leq k \leq K$, and $\bar{g}_m \in \mathbb{C}^{K \times 1}$ is a K×1 channel vector of complex channel estimates between the m-th antenna and the K UE antennas.

The mMIMO systems 100 or MIMO system 110 or 120 of FIGS. 1*a*, 1*b* and/or 1*c* may use the channel matrix G to generate a precoder for minimizing interference between users whilst maximizing the power usage of the APs and/or AP antennas 103*a*-103*m* and the like. For example, the traditional ZF precoder based on the Moore-Penrose pseudo-inverse of the channel matrix G (e.g., $G^*(G^T G^*)^{-1}$, where T represents the matrix transpose and * represents the complex conjugate operation) may be used to minimize the total power consumed by all serving APs or AP antennas. However, this is not necessarily the best precoder for use in MIMO systems 100, 110 or 120. For example, the per AP or per AP antenna power may vary a lot for distributed mMIMO system 100 or even the MIMO systems 110 and 120, and given the ZF precoder is scaled to satisfy the power constraint of each AP, this can leave much of the power budget unused at the other APs. The traditional ZF precoder is usually a suboptimal precoding solution when attempting to optimise the power budget for each AP.

FIGS. 2a-6 describe one or more low complexity "flat" precoding algorithms for generating a precoder that equalizes power for all serving APs iteratively and is near optimal within several or a suitable number of iterations (e.g., 2 to 5 iterations or a suitable number of iterations). An advantage of the low complexity "flat" precoding algorithms is that they are easily tunable: one can trade complexity (number of iterations) with performance (achieved signal-to-interference plus noise ratio (SINR)), and scalable by the number of users rather than the number of APs. For example, the low-complexity precoding algorithms described herein can be implemented for any number of AP antennas of one or more APs that are greater than or equal to the number of UE antennas of one or more UEs (e.g. M≥K) for precoding (e.g. ZF, MMSE or optimal linear precoder) operation. This leads to practical precoding for implementing distributed mMIMO system 100, cellular MIMO system 110, and/or MIMO system 120.

Figure 2A:
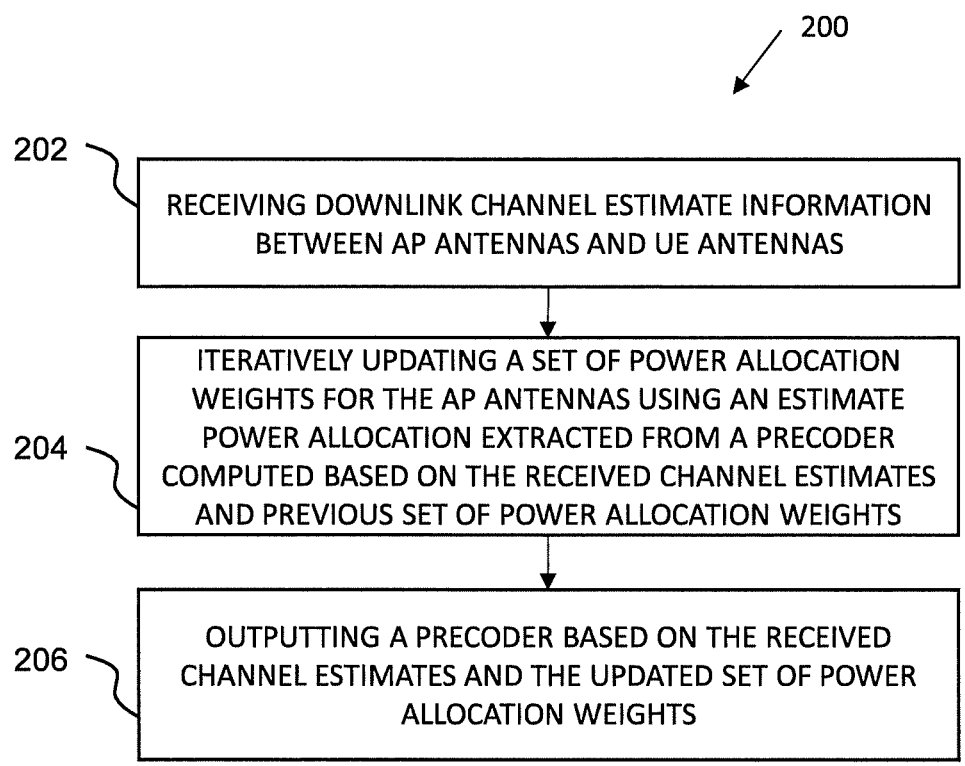
FIG. 2a is a flow diagram of an example iterative processing method according to some example embodiments.

FIG. 2a is a flow diagram of example iterative processing method 200 according to some example embodiments. The iterative processing method 200 may be implemented in an apparatus, such as network element 106 as described with reference to FIGS. 1a-1c, for generating a precoder. The example iterative processing method 200 may include one or more of the following operations.

In operation 202, receiving downlink channel estimates between a plurality of AP antennas 103a-103m of one or more APs and a plurality of UE antennas of one or more UEs in a communication system. For example, there may be M AP antennas 103a-103m and K UE antennas. As described with reference to FIGS. 1a-1c, the received downlink channel estimates between the plurality of AP antennas 103a-103m and the plurality of UE antennas 105a-105k may be represented by channel estimate matrix G.

In operation 204, iteratively updating a set of power allocation weights for the AP antennas of the one or more APs using an estimated power allocation extracted from a precoder, where the precoder is computed in each iteration based on the received downlink channel estimates and a previous set of power allocation weights of the previous iteration, until a stopping criterion is reached.

For example, the stopping criterion may include, without limitation, one or more of the following: a maximum number of iterations; the reduction in maximum power allocation in the current iteration compared with the maximum power allocation in the previous iteration is below a predetermined threshold or reaches a predetermined threshold; convergence of the set of power allocation weights; the difference between each power allocation weight of the current iteration and the corresponding previous power allocation weight of the previous iteration reaches a predetermined threshold; and/or any other stopping criterion suitable for determining the best set of power allocation weights for use in computing the precoder.

The set of power allocation weights are configured to steer the estimated power allocation towards an optimal power allocation for the AP antennas, or to minimise a power objective, or towards a particular desired or target power allocation. Thus, the precoder resulting from the set of power allocation weights is configured to meet the particular desired or target power allocation or power constraints for each AP antenna and/or AP and the like.

In operation 206, once the stopping criterion has been reached, outputting data representative of a precoder computed from the received channel estimates and the updated set of power allocation weights.

The updated set of power allocation weights may be the final set of power allocation weights output from the final iteration. Alternatively, the updated set of power allocation weights may be an i-th updated set of power allocation weights from the i-th iteration that results in a precoder that has the lowest dominant power allocation, where the dominant power allocation is the power allocation of the antenna with the highest power allocation. Alternatively or additionally, the updated set of power allocation weights may be an i-th updated set of power allocation weights from the i-th iteration that results in a precoder that has the lowest dominant power allocation below a target dominant power allocation threshold or the like. In another example, the iterative operation 204 may also keep track of the best set of power allocation weights that result in a precoder achieving a smallest dominant power allocation over all iterations, and then use the best set of power allocation weights when computing the precoder for output. The best set of power allocation weights is the set of power allocation weights that result in a precoder that achieves the smallest dominant power allocation. In another example, the iterative operation 204 may further include, after each i-th iteration, determining or testing whether the resulting i-th precoder computed from the i-th updated set of power allocation weights has a lower or substantially lower dominant power allocation compared to a current best precoder/current best set of power allocation weights from a previous iteration. If the i-th precoder has a lower or substantially lower dominant power allocation than the current best precoder, then the current best precoder and current best set of power allocation weights are replaced with the updated i-th precoder and updated i-th set of power allocation weights.

The precoder may be based on one or more MIMO precoders such as, without limitation, for example an interference suppressing precoder, a zero forcing (ZF) precoder, a regularised ZF precoder, a MMSE precoder, and/or any other type of MIMO precoder that may be computed from a set of power allocation weights and a received channel estimates, combinations thereto, modifications thereof, and/or as the application demands.

Figure 2B:
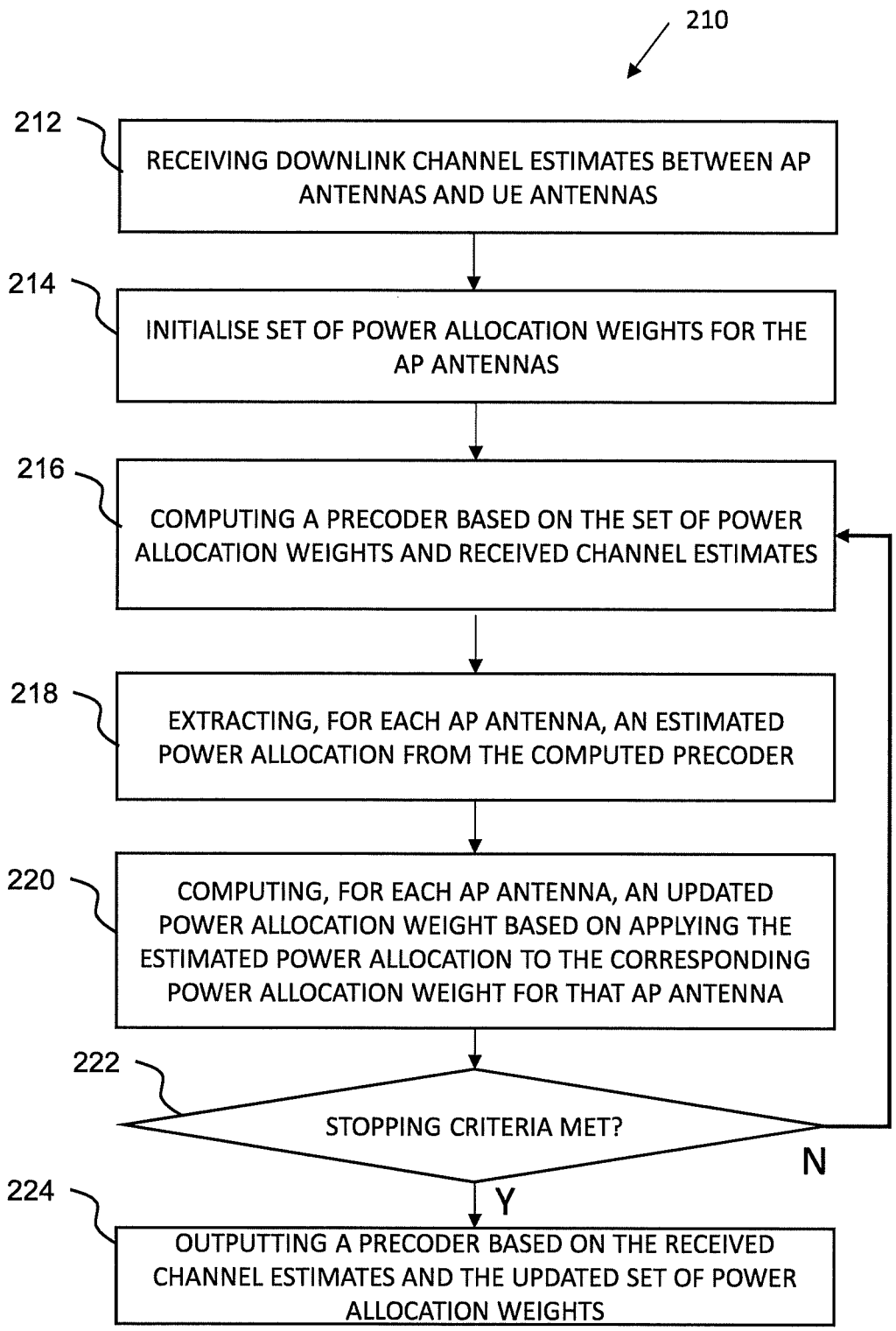
FIG. 2b is a flow diagram of another example iterative processing method according to some example embodiments.

FIG. 2b is a flow diagram of another example iterative processing method 210 according to some example embodiments. The iterative processing method 210 may be implemented in an apparatus, such as network element 106 as described with reference to FIGS. 1a-1c, for generating a precoder. The iterative processing method 210 may further modify the operations of example iterative processing 200 of FIG. 2a. The example iterative processing method 210 may include one or more of the following operations.

In operation 212, receiving downlink channel estimates between a plurality of AP antennas 103a-103m of one or more APs and a plurality of UE antennas 105a-105k of one or more UEs in a communication system. For example, there may be M AP antennas 103a-103m and K UE antennas. The received downlink channel estimates between the plurality of AP antennas 103a-103m and the plurality of UE antennas 104a-104b may be represented by a channel estimate matrix G.

In operation 214, initialising a set of power allocation weights for the AP antennas of the one or more APs. The set of power allocation weights may be denoted by w= $(w_1, \ldots, w_M)^T \in \mathbb{R}_+^{M \times 1}$, where $\mathbb{R}_+$ denotes the set of positive real numbers, where $w_m$ is the power allocation weight for the m-th AP antenna of the one or more APs for $1 \leq m \leq M$. For example, each of the power allocation weights, $w_m$, of the set of power allocation weights, w, may be set to 1 or any other suitable value >0 for $1 \leq m \leq M$. For example, initializing the set of power allocation weights, w, to an initial set of power allocation weights, $w_0 \in \mathbb{R}_+^M$. In another example, each of the power allocation weight elements, $w_m$, of the set of power allocation weights, w, may be set to $w_m = 1/\|\bar{g}_m\|_2$ for $1 \leq m \leq M$, where $\bar{g}_m$ is the m-th row of the channel estimate matrix G. In another example, initializing the set of power allocation weights, w, to an initial set of power allocation weights, $w_0 = (1, \ldots, 1)^T$ or $w_m = 1$ for all m. In a further example, initializing the set of power allocation weights, w, to an initial set of power allocation weights, $w_0 = [w_n]_i$, where $[w_n]_i$ is an updated n-th output set of power allocation weights from a previous i-th set of iterations.

Operations 216, 218, 220 and 222 are configured to perform an iterative updating, for each n-th iteration, of a set of power allocation weights, $w_n$, for the n-th iteration in relation the AP antennas of the one or more APs using an estimated power allocation extracted from a n-th precoder computed in the n-th iteration, for $1 \leq n \leq N$. In the n-th iteration, the n-th precoder is computed based on the received downlink channel estimates, G, and a previous set of power allocation weights $w_{n-1}$ of the previous (n-1)-th iteration, until a stopping criterion is reached.

For example, for the n-th iteration computing the n-th or updated set of power allocation weights based on $w_n = \Omega(w_{n-1})$, where:

$$\Omega(w_{n-1}) = \left( \frac{w_1[n-1]}{norm(\bar{q}_1(w_{n-1}))}, \ldots, \frac{w_M[n-1]}{norm(\bar{q}_M(w_{n-1}))} \right)^T,$$

and where the (n-1)-th set of power allocation weights is denoted $w_{n-1} = (w_1[n-1], \ldots, w_M[n-1])^T \in \mathbb{R}_+^{M \times 1}$, where $w_m[n-1] \in \mathbb{R}_+$ is the m-th weight of the (n-1)-th set of power allocation weights, $w_{1-1}$, the (n-1)-th extracted estimated power allocation for the m-th AP antenna may be based on the square of the norm($\bar{q}_m(w_{n-1})$), where $\bar{q}_m(w_{n-1})$ is the (n-1)-th set of precoder coefficients associated with the m-th AP antenna and is extracted from the m-th row of a (n-1)-th precoder matrix, $Q(w_{n-1}) \in \mathbb{C}^{M \times K}$, in which $Q(w_{n-1})$ is computed based on a function or combination of the downlink received channel estimates, G, and the (n-1)-th set of power allocation weights, $w_{n-1}$. $Q(w_{n-1})$ is a function for calculating a precoding matrix based on a combination of the downlink received channel estimate matrix, G, and the (n-1)-th set of power allocation weights, $w_{n-1}$. In the first iteration, when n=1, the precoder matrix is calculated using the initial set of power allocation weights $w_0 \in \mathbb{R}_+^M$, where the initial precoder matrix is $Q(w_0) \in \mathbb{C}^{M \times K}$, which is computed based on the downlink received channel estimate matrix, G, and the initial set of power allocation weights, $w_0$, and $\bar{q}_m(w_0)$ is extracted from the m-th row of the initial precoder matrix is $Q(w_0)$.

In the above, the function norm($\bar{q}_m(w_{n-1})$) is any norm of $\bar{q}_m(w_{n-1})$, such as, without limitation, for example 2-norm (e.g. $\|\bar{q}_m(w_{n-1})\|_2$) or p-norm of $\bar{q}_m(w_{n-1})$, for p>2 and/or any other suitable norm as the application demands. It is noted that when the (n-1)-th extracted estimated power allocation for the m-th AP antenna is $\|\bar{q}_m(w_{n-1})\|_2^2$, then this predicts the transmitted power associated with the m-th AP antenna.

For example, the function norm(x) of a vector x may be any type of suitable norm of x including, without limitation, for example 2-norm/Euclidean norm, p-norm, absolute value norm, composite norm (e.g. max(norm(x), $\tau$), where $\tau \in \mathbb{R}_+$, semi-norm, and/or any other suitable type of norm, combinations thereto, modifications thereto and/or as the application demands. For example, the vector x may be $\bar{q}_m(w_n)$ and, the squared 2-norm of $\bar{q}_m(w_n)$ (e.g. $\|\bar{q}_m(w_n)\|_2^2$) for the m-th AP antenna may provide an indication or estimate/prediction of how much power will be transmitted by the m-th AP antenna, if using the designed precoder or precoder matrix $Q(w_n)$ computed using the corresponding set of power allocation weights $w_n$ and received channel estimates, G.

For each of one or more iterations, $1 \leq n \leq N$, where N is the maximum number of iterations, the following operations of the iterative process 210 may be performed:

In operation 216, computing an (n-1)-th precoder $Q(w_{n-1})$ based on the received downlink channel estimates, G, and a previous set of power allocation weights $w_{n-1}$ of the previous (n-1)-th iteration. In the first iteration, when n=1, the previous set of power allocation weights are the initialised set of power allocation weights $w_0$ from operation 214.

In operation 218, extracting an estimated power allocation associated with each AP antenna from the computed (n-1)-th precoder. For example, when the (n-1)-th extracted estimated power allocation for the m-th AP antenna is the square of norm($\bar{q}_m(w_{n-1})$), where the set of precoder coefficients $\bar{q}_m(w_{n-1})$ may be obtained from the m-th row of the computed (n-1)-th precoder matrix $Q(w_{n-1})$. For example, when the 2-norm is used, the (n-1)-th extracted estimated power allocation for the m-th AP antenna is the square of $\|\bar{q}_m(w_{n-1})\|_2$, where the set of precoder coefficients $\bar{q}_m(w_{n-1})$ may be obtained from the m-th row of the computed (n-1)-th precoder matrix $Q(w_{n-1})$.

In operation 220, updating a set of power allocation weights, $w_n$, for the n-th iteration in relation to the AP antennas of the one or more APs based on applying the (n-1)-th estimated power allocation associated with each m-th AP antenna to the corresponding (n-1)-th power allocation weight, $w_m[n-1]$, for the m-th AP antenna from the (n-1)-th set of power allocation weights $w_{n-1}$. For example, updating, for each of the M AP antennas, the corresponding power allocation weight, $w_m[n]$, of said m-th AP antenna for the set of power allocation weights, $w_n$, based on multiplying the corresponding previous (n-1)-th power allocation weight, $w_m[n-1]$, of the m-th AP antenna by the inverse of the square root of the (n-1)-th estimated power allocation of said m-th AP antenna, for $1 \leq m \leq M$.

For example, the 2-norm of $\bar{q}_m(w_{n-1})$ may be applied when computing the n-th or updated set of power allocation weights based on: $w_n = \Omega(w_{n-1})$, where $$\Omega(w_{n-1}) = \left( \frac{w_1[n-1]}{\|\bar{q}_1(w_{n-1})\|_2}, \ldots, \frac{w_M[n-1]}{\|\bar{q}_M(w_{n-1})\|_2} \right)^T,$$

and where the (n-1)-th set of power allocation weights is denoted as $w_{n-1} = (w_1[n-1], \ldots, w_M[n-1])^T \in \mathbb{R}_+^{M \times 1}$, where $w_m[n-1] \in \mathbb{R}_+$ is the m-th weight of the (n-1)-th set of power allocation weights, $w_{n-1}$. The (n-1)-th extracted estimated power allocation for the m-th AP antenna is the square of $\|\bar{q}_m(w_{n-1})\|_2$, where $\bar{q}_m(w_{n-1})$ is the (n-1)-th set of precoder coefficients associated with the m-th AP antenna and is extracted from the m-th row of a (n-1)-th precoder matrix, $Q(w_{n-1}) \in \mathbb{C}^{M \times K}$, in which $Q(w_{n-1})$ is computed based on the downlink received channel estimates, G, and the (n−1)-th set of power allocation weights, $w_{n-1}$.

In operation 222, determining whether one or more stopping condition(s) or criteria have been achieved. If the stopping criteria/condition(s) has been achieved, then proceed to operation 224, otherwise, proceed to operation 216 for the next iteration, where n=n+1.

For example, the stopping criteria/condition(s) may be based on one or more of previously calculated set of power allocation weights such as $w_n$ and $w_{n-1}$, previously estimated power allocations such as $\|\bar{q}_m(w_{n-1})\|_2^2$ and $\|\bar{q}_m(w_{n-2})\|_2^2$, on the iteration counter n, and/or other data. For example, the stopping criterion/criteria/condition(s) may be based on at least one of, or a combination of, without limitation for example: a maximum number N of iterations is reached; an improvement in a maximum power level over all antennas, compared with the maximum power level over all antennas in a previous iteration is below a threshold or reaches a threshold; the corresponding estimated power allocation associated with each AP antenna or AP has minimised a corresponding power objective; the corresponding estimated power allocation associated with each AP antenna or AP has reached a corresponding power allocation target; when the (n−1)-th precoder achieves or reaches a power allocation target for all of the M antennas and/or APs; convergence of the set of power allocation weights; determining convergence of each power allocation weight of the updated set of power allocations; determining whether a difference between each power allocation weight of the updated set of power allocation weights and the corresponding power allocation weight of the previous set of power allocation weights meets one or more thresholds; and/or any other suitable stopping criteria that results in determining a suitable set of power allocation weights for use in computing the precoder.

In operation 226, once the stopping criterion/criteria has been reached, outputting data representative of a precoder computed from the received channel estimates and the best updated set of power allocation weights. As described with reference to FIG. 2a, the best updated set of power allocation weights may be the final set of power allocation weights output from the final iteration, i.e. $w_n$, or the previous set of power allocation weights $w_{n-1}$, for which the corresponding precoder $Q(w_{n-1})$ has already been calculated. Alternatively, the updated set of power allocation weights may be an i-th updated set of power allocation weights from the i-th iteration that results in a precoder that results in a dominant power allocation or best meets required thresholds, power objective, or a power allocation target and the like. Additionally or alternatively, as a further example, outputting data representative of a precoder may further include outputting data representative of a precoder based on at least one of: a precoding matrix of $Q(w_n)$, where n is the final iteration; a precoding matrix of $Q(w_{n-1})$, where n is the final iteration; and a precoding matrix of $Q(w_i)$, where $w_i$ is the i-th set of power allocation weights for the i-th iteration, $1 \leq i \leq N$, that results an estimate power allocation closest to a power objective or target power allocation for the plurality of AP antennas.

The precoder (e.g. Q(w)) in the iterative processing method 200 and/or 210 may be based on a ZF precoder, MMSE precoder and/or any other interference suppression precoder and the like. For example, the precoder matrix Q(w) may be derived or calculated based on computing a combination of the downlink received channel estimates, G, and a set of power allocation weights, w. As an example of such a combination, the precoder matrix Q(w) may be a ZF precoder based on $Q(w) = WG^*(G^T WG^*)^{-1}$, where $W \in \mathbb{R}_+^{M \times M}$ is a diagonal matrix with the elements of the set of power allocation weights w on the diagonal. Although the ZF precoder is described herein, this is by way of example only and the invention is not so limited, it is to be appreciated by the skilled person that the precoder matrix Q(w) may be based on any other type of MIMO precoder that includes a combination of downlink received channel estimates, G, and a set of power allocation weights, w, such as, without limitation, for example the MMSE precoder, a regularised-ZF precoder (e.g. $Q(w) = WG^*(G^T WG^* + \delta 1)^{-1}$, where $\delta$ is a regularising factor), and/or any other suitable MIMO type precoder, combinations thereof, modifications thereto, as herein described, and/or as the application demands.

The iterative processing method 210 may be further modified when one or more of a plurality of APs 102a-102n associated with AP antennas of the plurality of AP antennas 103a-103m have different power constraints. The corresponding operations 216-222 of iterative processing method 210 may be further modified for iteratively updating the set of power allocation weights, w, based on for each of one or more iterations, $1 \leq n \leq N$, where N is a maximum number of iterations, updating the n-th set of power allocation weights by computing $w_n = \Omega(w_{n-1})$, where:

$$\Omega(w_{n-1}) = \left( \frac{P_1 w_1[n-1]}{\|\bar{q}_1(w_{n-1})\|_2}, \ldots, \frac{P_M w_M[n-1]}{\|\bar{q}_M(w_{n-1})\|_2} \right)^T,$$

and where the (n−1)-th set of power allocation weights is denoted $w_{n-1} = (w_1[n-1], \ldots, w_M[n-1])^T \in \mathbb{R}_+^{M \times 1}$, $w_m[n-1] \in \mathbb{R}_+$ the m-th weight of the (n−1)-th set of power allocation weights, $w_{n-1}$, $P_m^2$ is the power constraint on the m-th transmit chain, where $\bar{q}_m(w_{n-1})$ is the m-th row of the precoder matrix, $Q(w_{n-1}) \in \mathbb{C}^{M \times K}$ for $1 \leq m \leq M$, which is computed based on the downlink received channel estimates, G, and the (n−1)-th set of power allocation weights, $w_{n-1}$.

Figure 2C:
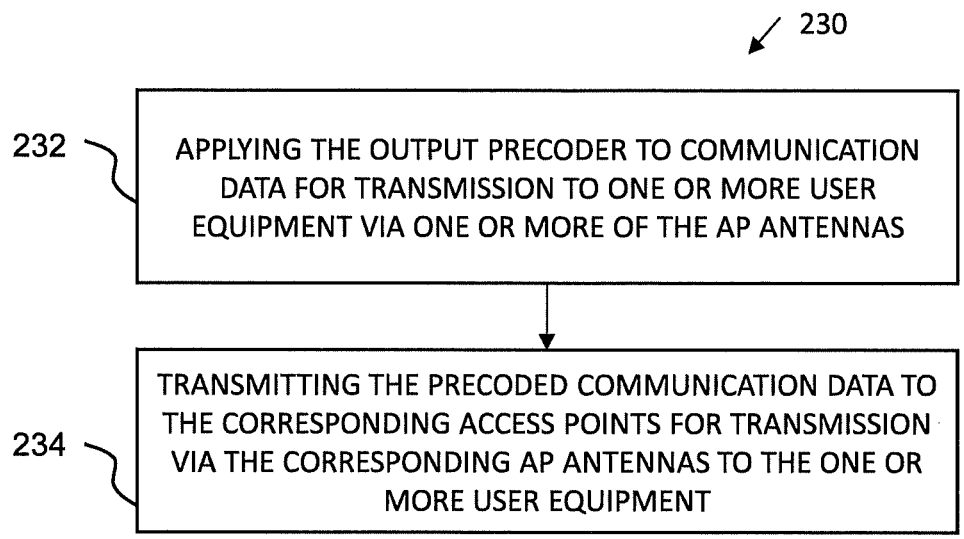
FIG. 2c is a flow diagram of an example transmission process using a precoder according to some example embodiments.

FIG. 2c is a flow diagram of an example transmission process 230 using a precoder according to some example embodiments. Once data representative of a precoder has been generated or output, e.g. from the iterative processing methods 200 or 210 and/or as herein described with reference to FIGS. 1a to 6, an apparatus such as network element 106 may be used to apply the precoder to communication data that is to be transmitted to one or more of the UEs 104a-104j. The transmission process 230 may include the following steps of:

In operation 232, applying the data representative of the output precoder (e.g. output from operations 206 or 224 of FIG. 2a or 2b) for precoding communication data for transmission to one or more UEs 104a-104j via one or more of the AP antennas 103a-103m. For example, the precoder may be an M×K precoder matrix, as there may be K different communication data intended for transmission to the corresponding K UE antennas 105a-105k. The m-th row is applied to the communication data to obtain a single m-th precoded communication data that is to be transmitted from the m-th AP antenna of the plurality of AP antennas 103a-103m for $1 \leq m \leq M$ to the plurality of UE antennas 105a-105k, $1 \leq k \leq K$.

In operation 234, transmitting the precoded communication data to one or more corresponding APs 102a-102n for transmission via the corresponding AP antennas 103a-103m to the corresponding UE antennas 105a-105k of the one or more UEs 104a-104j.

Figure 2D:
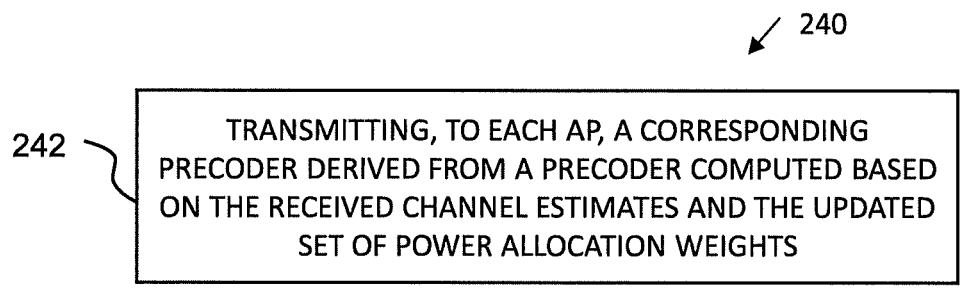
FIG. 2d is a flow diagram of another example transmission process using a precoder according to some example embodiments.

FIG. 2d is a flow diagram of another example transmission process 240 using a precoder according to some example embodiments. Once data representative of a precoder has been generated or output, e.g. from the iterative processing methods 200 or 210 and/or as herein described with reference to FIGS. 1a-6, an apparatus such as network element 106 may be used to send the corresponding portions or sets of precoder coefficients of the precoder to one or more APs 102a-102n with the corresponding AP antennas 103a-103m. Each of the one or more APs 102a-102n may apply the corresponding received precoder portion (set of precoder coefficients) to communication data that is to be transmitted by the AP antennas of each one or more APs 10 to corresponding UE antennas 105a-105k of the one or more of the UEs 104a-104j. The transmission process 240 may include the following steps of:

In operation 242, transmitting, to each AP, data representative of precoder information associated with the AP antennas 103a-103m of each AP, the precoder information extracted from data representative of the output precoder (e.g., the precoder output from operations 206 or 224 of FIG. 2a or 2b). Each AP is configured to apply the corresponding precoder information for precoding communication data for transmission via the corresponding AP antennas of said each AP to one or more corresponding UE antennas associated with one or more UEs.

For example, the precoder information may be the precoder coefficients associated with each AP antenna, which may be extracted from the output precoder or precoder matrix. As an example, an m-th set of precoder coefficients for the m-th AP antenna may be extracted from the m-th row of an output precoder matrix Q(w). Thus, transmitting, to each AP for 1≤m≤M, data representative of the m-th set of precoder coefficients to the AP 102a associated with the m-th AP antenna. Depending on the number of AP antennas an AP has, each AP may receive one or more sets of precoder coefficients corresponding to the AP antennas of that AP. Once received, each AP 102a is configured to apply the corresponding associated precoder coefficients for precoding communications data for transmission via the AP antennas of the AP to the corresponding UE antennas of one or more UEs 104a-104j.

Figure 2E:
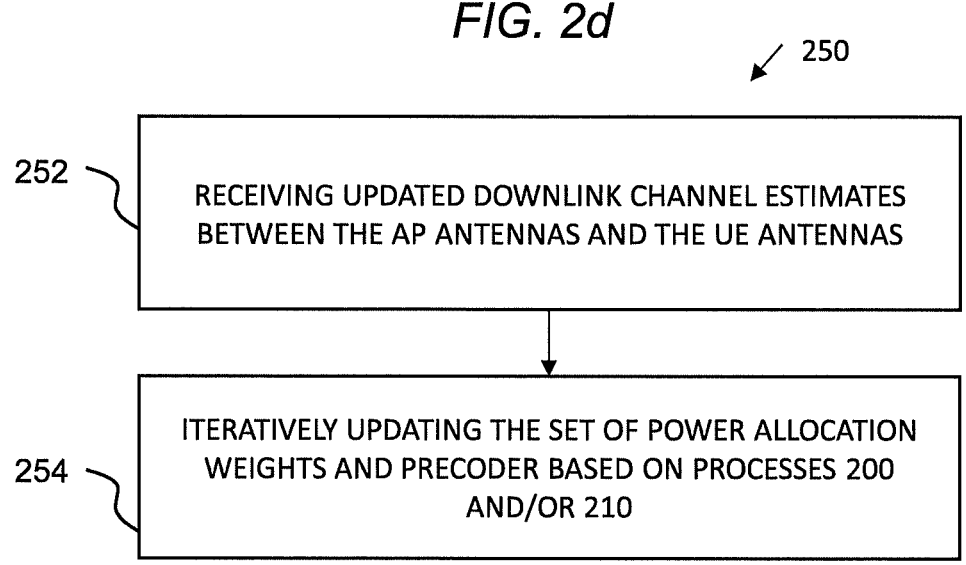
FIG. 2e is a flow diagram of example update iterative processing method according to some example embodiments.

FIG. 2e is a flow diagram of example processing update operations 250 according to some example embodiments:

In operation 252, receiving updated downlink channel estimates, G, between one or more of the M AP antennas 103a-103m of one or more APs 102a-102n and one or more of the K UE antennas 105a-105k of the UEs 104a-104j. All of the downlink channel estimates, G, may be updated for the downlink channels between the M AP antennas 103a-103m of one or more APs 102a-102n and the K UE antennas 105a-105k of the UEs 104a-104j. Alternatively or additionally, some of the downlink channel estimates, G, may be updated for the downlink channels between the MAP antennas 103a-103m of one or more APs 102a-102n and the K UE antennas 105a-105k of the UEs 104a-104j. The updates for the downlink channel estimates, G, may be generated/estimated according to a periodic or aperiodic schedule depending on the type of wireless communication standard and/or system that is being used.

In operation 254, iteratively updating the set of power allocation weights and the precoder based on using the updated channel estimate matrix, G, using iterative processing methods 200 and/or 210, combinations thereof, modifications thereto and/or as herein described with reference to FIGS. 1a to 6 and/or as the application demands.

Referring to FIGS. 2a to 2e, further modifications to the iterative process methods 200 or 210 of FIGS. 2a to 2e may be made depending on the type of communication system being implemented. For example, the communication system may be based on an orthogonal frequency division multiplexing (OFDM), where the OFDM communication system includes one or more sets of subcarriers. The corresponding operations of the iterative process methods 200 and/or 210 of FIGS. 2a to 2e may be further modified for iteratively updating the set of power allocation weights for OFDM. For example, the set of power allocation weights may be iteratively updated based on iteratively updating the set of power allocation weights of the AP antennas for each subcarrier in the set of subcarriers using an estimated power allocation extracted from a precoder computed for each subcarrier in the set of subcarriers. The precoder for each subcarrier in the set of subcarriers may be computed based on the received channel estimates for each subcarrier in the set of subcarriers and the previous corresponding set of power allocation weights of the AP antennas for each subcarrier in the set of subcarriers. Once the stopping criterion has been met, data representative of a precoder for each subcarrier in the set of subcarriers may be output. For example, each precoder for each subcarrier in the set of subcarriers computed from the received channel estimates of each subcarrier in the set of subcarriers and the updated set of power allocation weights of each AP antenna associated with each subcarrier in the set of subcarriers.

In an example, rather than computing all the precoders for all the subcarriers for all the AP antennas at once, precoders for some subcarriers may be computed based on precoders already computed and output for other subcarriers. The iterative processes 200 and/or 210 may be further modified, when iteratively updating the set of power allocation weights of the AP antennas associated with a first and a second subcarrier in the set of subcarriers, to first iteratively compute the precoder for the first subcarrier in the set of subcarriers and then iteratively compute the precoder for the second subcarrier in the set of subcarriers, where the set of power allocation weights of the AP antennas for the second subcarrier are initialised based on the precoder computed for the first subcarrier in the set of subcarriers.

As another example, in each iteration, the precoder for each of the subcarriers in the set of subcarriers may be successively computed in order of increasing or decreasing subcarrier index, where the set of power allocation weights of the AP antennas for subcarrier index 1 is $w_n^{(I)}$ and initialising the set of power allocation weights of the AP antennas for subcarrier index 1 to $w_0^{(I)}=w_n^{(I-1)}$ when successively computing precoders for increasing subcarrier index or to $w_0^{(I)}=w_n^{(I+1)}$ when successively computing precoders for decreasing subcarrier index.

Figure 3A:
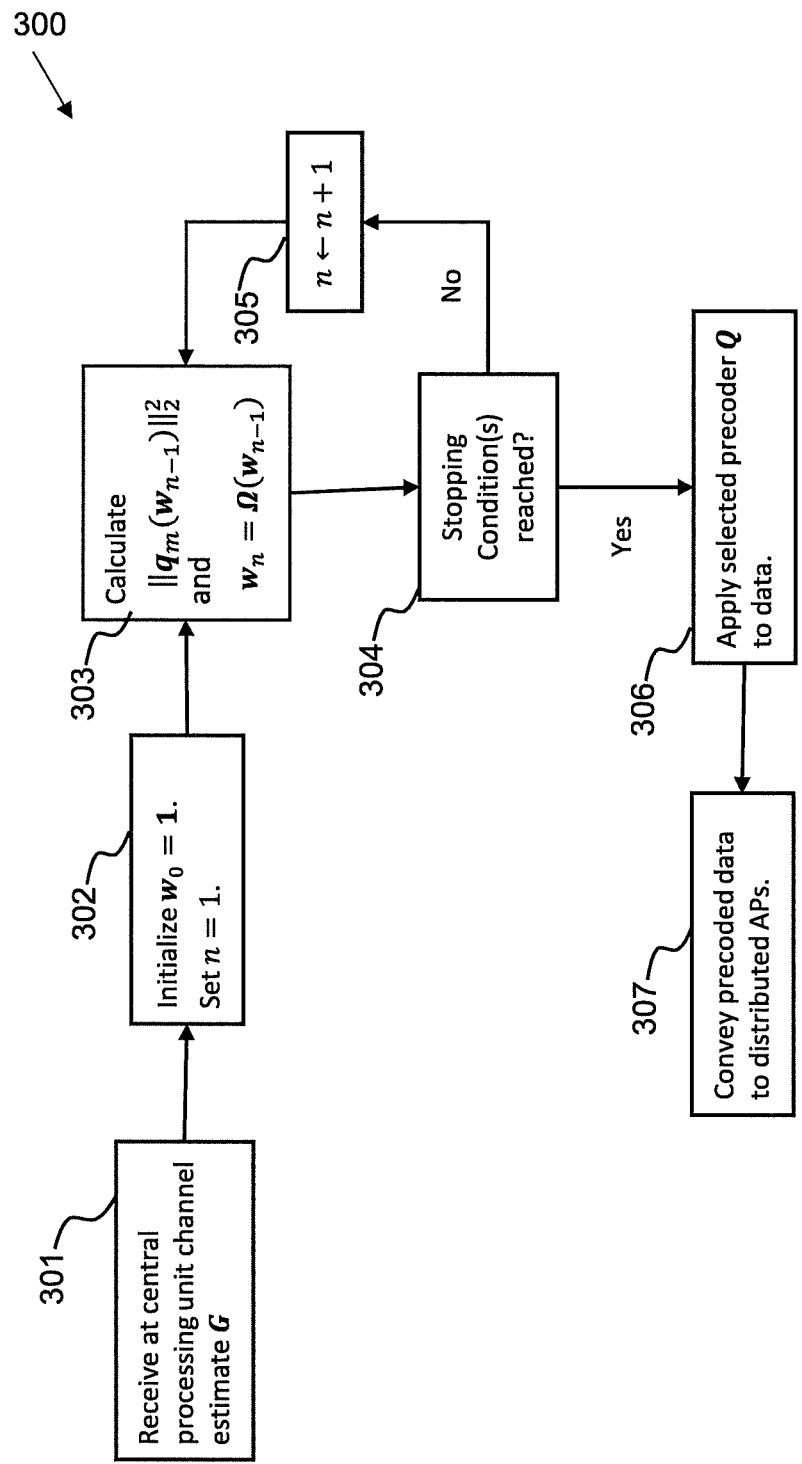
FIG. 3a is a block diagram of another example iterative precoder process according to some example embodiments.

FIG. 3a is a block diagram of another example iterative precoder process 300 according to some example embodiments. The iterative precoder process 300 may be based on the iterative processing methods 200 or 210 as described with reference to FIG. 2a or 2b and the like. The blocks of the iterative precoder process 300 may be used to further modify the operations of iterative processing methods 200 or 210 as described with reference to FIG. 2a or 2b. In this example, the precoder is based on a ZF beamforming precoder using a generalized pseudo-inverse formula $Q(w)=WG^*(G^TWG^*)^{-1}$ where W is a diagonal matrix with the elements of the set of power allocation weights, w, along the diagonal, where $w=(w_1, \ldots, w_M)^T \in \mathbb{R}_+^{M \times 1}$. It is noted that superscript * denotes complex conjugate, and superscript T denotes matrix transpose, where $\mathbb{R}_+^M$ denotes M dimensional product space of positive real numbers. Note that as long as the matrix $G^T W G^*$ is invertible, the precoder is well-defined and satisfies the zero-forcing condition $G^T Q(w) = I_K$, where $I_K$ is a K×K identity matrix. The set of precoder coefficients is denoted by $\bar{q}_m(w)$, which is the m-th row of Q(w). In this example, the estimated power allocation for the m-th AP antenna may be based on $\|\bar{q}_m(w)\|_2^2$ and the transmit power for the m-th AP antenna of the plurality of AP antennas 103a-103m is set to be proportional to $\|\bar{q}_m(w)\|_2^2$. The traditional ZF precoder is obtained by setting each element $w_m$ of the set of power allocation weights, w, to $w_m = 1$ for all m, in which case the transmit powers may vary significantly. The objective that is being minimised by the iterative process 300 for this example is the minimisation of $f(w) = \max \|\bar{q}_m(w)\|_2^2$, that is, the maximum transmitted power over all AP antennas, which forms an optimisation objective or objective function for determining a suitable set of power allocation weights for the precoder. Thus, equalization of per AP antenna or per AP power is achieved by manipulating the set of power allocation weights or weighting vector $w = (w_1, \ldots, w_M)^T$, where the weighting vector that minimises the objective function is obtained iteratively based on the iterative precoder processing method 300, which includes the following process blocks of:

In process block 301, receiving at a central processing unit of a network element 106 the channel estimate matrix G for the downlink channels between the M AP antennas 103a-103m of the one or more APs 102a-102n and the K UE antennas 105a-105k of the one or more UEs 104a-104j.

In process block 302, initializing the set of power allocation weights, w, to an initial set of power allocation weights, $w_0 = (1, \ldots, 1)^T$ or $w_m = 1$ for all m. As described with reference to operation 214 of FIG. 2b, other initialisations may be used for the initial set of power allocation weights $w_0$. Initialise the number of iterations n=1.

In process block 303, computing the n-th updated set of power allocation weights, $w_n$, based on $w_n = \Omega(w_{n-1})$, where the mapping $$\Omega: [0, \infty)^M \to [0, +\infty)^M,$$

is defined by $$\Omega(w) = \left( \frac{w_1}{\|\bar{q}_1(w)\|_2}, \ldots, \frac{w_M}{\|\bar{q}_M(w)\|_2} \right)^T,$$

and where $\bar{q}_m(w)$ is the m-th row of Q(w), which in this example is computed as $Q(w) = WG^*(G^T W G^*)^{-1}$, where W is a diagonal matrix with the elements of the set of power allocation weights, w, along the diagonal, where $w = (w_1, \ldots, w_M)^T \in \mathbb{R}_+^{M \times 1}$ and G it the channel estimate matrix for the downlink channels. The values $\|\bar{q}_m(w_{n-1})\|_2$ for $1 \leq m \leq M$, are also calculated as part of this step and are retained for use in the next step.

In process block 304, determining whether a stopping condition/criterion (or stopping conditions/criteria) has been reached, for example, by computing $f(w_{n-1}) = \max \|\bar{q}_m(w_{n-1})\|_2^2$ based on the values $\|\bar{q}_m(w_{n-1})\|_2$ previously computed and determining if $f(w_{n-1})$ and $f(w_{n-2})$ are sufficiently close, or if $f(w_{n-1})$ is sufficiently close to the median of the values $\mu \|\bar{q}_m(w_{n-1})\|_2^2$, and/or a maximum number of iterations N is reached. If the stopping criterion/criteria is not met (e.g., No), and also n<=N, then proceed to block 305, otherwise (e.g. Yes) proceed to block 306. Alternatively or additionally, one or more other stopping criterions may be applied as described, without limitation, for example in operation 222 of FIG. 2b.

In process block 305, increment n, i.e. n←n+1, and proceed to block 303 for computing the (n+1)-th set of power allocation weights.

In process block 306, select a precoder $Q(w_{n-1})$, for $1 \leq n \leq N$ and apply the selected precoder $Q(w_{n-1})$, to communication data for transmission via the M AP antennas to the corresponding UE antennas of the one or more UEs 104a-104j. The advantage of selecting precoder $Q(w_{n-1})$ is because $w_{n-1}$ and/or $Q(w_{n-1})$ have already been calculated/computed and verified to be suitable as the stopping criterion has been met based on $w_{n-1}$ and $Q(w_{n-1})$, i.e. using $\bar{q}_m(w_{n-1})$ for $1 \leq m \leq M$ when calculating $f(w_{n-1})$ etc. As an alternative, block 306 may be configured to select a precoder $Q(w_n)$ as it is expected that $w_n$ and $Q(w_n)$ should be suitable as well, but this requires additional computation of the precoder matrix $Q(_n)$. Alternatively or as an option, a precoding matrix or precoder of $Q(w_i)$ may be selected, where $w_i$ is the i-th set of power allocation weights for the i-th iteration, $1 \leq i \leq N$, that results in a dominant power allocation closest to a power level threshold for the plurality of AP antennas. Alternatively or as an option, a precoding matrix or precoder of $Q(w_j)$ may be selected, where $w_j$ is the j-th set of power allocation weights for the j-th iteration, $1 \leq j \leq N$, that is determined to be the best or optimal set of power allocation weights based on one or more criteria such as, without limitation, for example an improvement in a maximum power level over all antennas, compared with the maximum power level over all antennas in a previous iteration is below a threshold or reaches a threshold, where the power level for the m-th antenna may be estimated based on the square of $\|\bar{q}_m(w_j)\|_2$ for the j-th iteration, $1 \leq j \leq N$.

In process block 307, send or convey the precoded communication data to the corresponding one or more APs of the communication system for transmission via the corresponding MAP antennas to the corresponding UE antennas of the one or more UES 104a-104j. It is to be appreciated that block 307 may be modified based on transmission methods 230 or 240 of FIGS. 2c and 2d.

In a cell-free system 100 or a cellular system 110 different AP antennas 103a-103m may have different power constraints. For example, this may be due to different transmission hardware being installed at different locations and/or other environmental factors and/or constraints. So, based on hardware configuration and the like, different transmit chains in the communication system 100 or 110 might have different power constraints. In some embodiments, the mapping $\Omega(w)$ can be further modified to take into account these constraints. For example, suppose that the power constraint on transmit chain m (or the m-th antenna) is $P_m^2$. These power constraints for all M AP antennas 103a-103m may be enforced by the mapping:

$$\Omega(w) = \left( \frac{P_1 w_1}{\|\bar{q}_1(w)\|_2}, \ldots, \frac{P_M w_M}{\|\bar{q}_M(w)\|_2} \right)^T.$$

The blocks 303-305 of the iterative ZF process 300 may be performed using this power constraint mapping $\Omega(w)$.

Figure 3B:
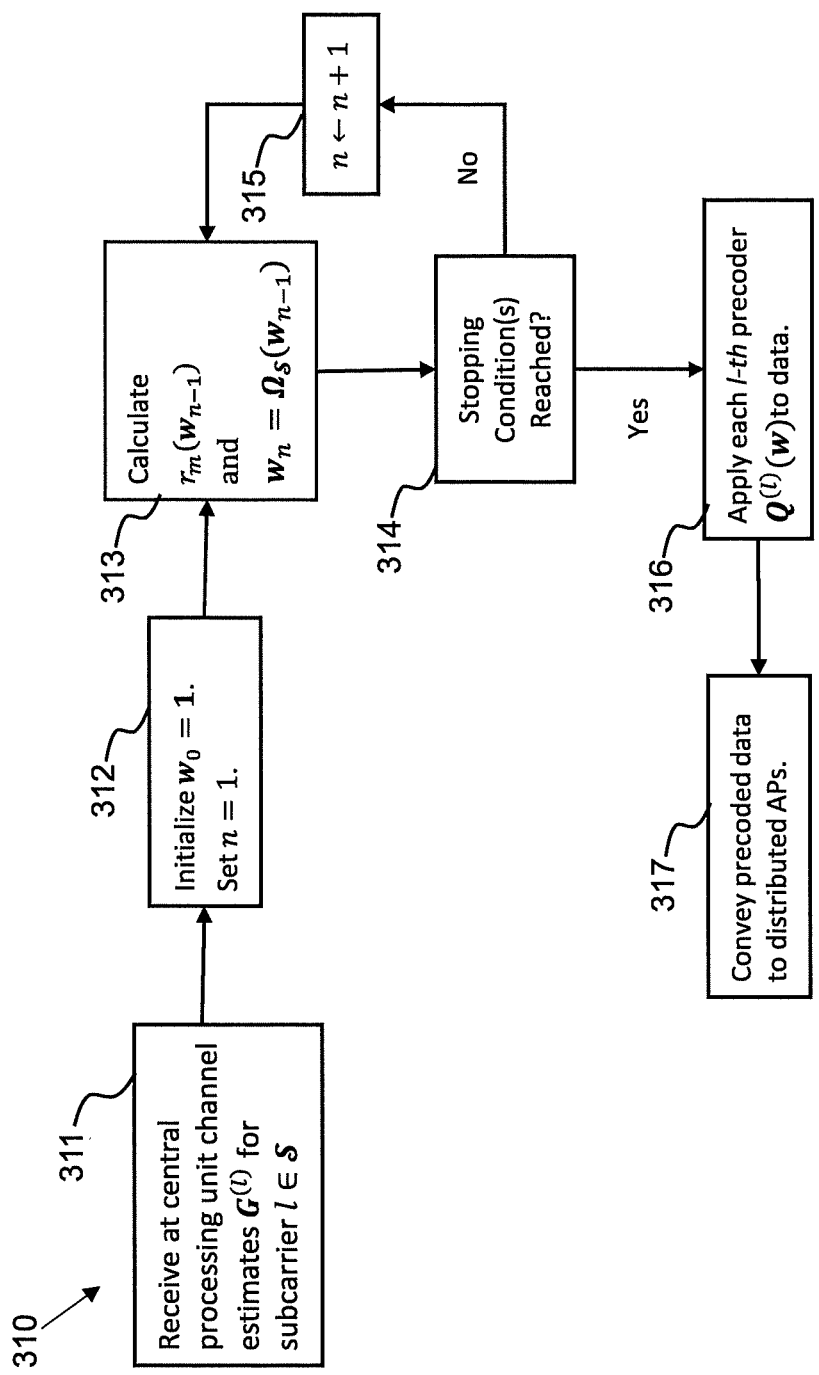
FIG. 3b is a block diagram of a further example iterative precoder process according to some example embodiments.

FIG. 3b is a block diagram of a further example iterative zero forcing precoder process 310 according to some example embodiments. The iterative precoder process 310 may be based on the iterative processing methods 200 or 210 as described with reference to FIG. 2a or 2b and the like. The blocks of the iterative precoder process 310 may be used to further modify the operations of iterative processing methods 200 or 210 as described with reference to FIG. 2a or 2b or process 310 of FIG. 3a. In this example, the communication system is an orthogonal frequency division multiplexing (OFDM) system, where the OFDM system includes one or more sets of subcarriers. The corresponding operations or blocks of the iterative process methods 200 and/or 210 or iterative ZF process 310 of FIGS. 2a, 2b and/or 3a may be further modified for iteratively updating the set of power allocation weights for an OFDM system. In this example, the precoder is based on the ZF precoder. In an OFDM system, the precoder needs to be calculated for each subcarrier or group of subcarriers. For simplicity, assume that each subcarrier has its own precoder, and denote the n-th set of power allocation weights for subcarrier l as $w_n^{(l)}$, which is the power allocation weight vector after iteration n on subcarrier l. If the precoders are computed successively in order of increasing subcarrier index, then one could initialize the weight vector for subcarrier l based on the final weight vector for subcarrier l-1, i.e. set $w_0^{(l)} = w_n^{(l-1)}$. Alternatively or additionally, if the precoders are computed successively in order of decreasing subcarrier index, then one could initialize the weight vector for subcarrier l based on the final weight vector for subcarrier l+1, i.e. set $w_0^{(l)} = w_n^{(l+1)}$. Due to the similarity of the channel on adjacent subcarriers, this successive computation may provide the advantage of reducing the number of iterations required for computing the precoder per subcarrier.

In the OFDM system, the precoder needs to be calculated for each subcarrier or group of subcarriers, and in $\Omega(w)$, the estimated power allocations $\|\bar{q}_1(w)\|_2, \ldots, \|\bar{q}_M(w)\|_2$ are calculated per subcarrier or group of subcarriers, and the obtained n-th set of power allocation weights $w_n$ is per subcarrier or group of subcarriers. This is appropriate when the power of each subcarrier should be constrained, for example due to government regulations on transmitted power levels. In other situations, it is only the total power over all subcarriers that must be constrained, for example to limit non-linear distortion in a power amplifier. In this case a single set of weights can be defined that is used to design the precoders on all subcarriers. Effective weights are found by an iterative mapping similar to the one previously described, but that takes into account all subcarriers simultaneously.

In this example, the channel matrix on subcarrier l is denoted as $G^{(l)} \in \mathbb{C}^{M \times K}$, for each subcarrier in a set of subcarriers S. A single weight vector $w = (w_1, \ldots, w_M)^T \in \mathbb{R}_+^M$ is defined as in the previous examples, and the precoder for each subcarrier $l \in S$ is denoted or computed as $Q^{(l)}(w) = WG^{(l)*}(G^{(l)T}WG^{(l)*})^{-1}$. In addition, the set of precoder weights for the l-th subcarrier for the m-th AP antenna is denoted by $\bar{q}_m^{(l)}(w)$ as the m-th row of $Q^{(l)}(w)$. The square root of the total transmit power for the m-th AP antenna, for $1 \leq m \leq M$, incorporating contributions for all subcarriers is then proportional to:

$$r_m(w) = \sqrt{\sum_{l \in S} \|\bar{q}_m^{(l)}(w)\|_2^2}.$$

The objective function to be minimized in this case is in this case is $f(w) = \max r_m(w)^2$, which may form the power objective, where a specific value of the power objective may be a power target. Typically, the iterative methods described herein aim to minimise the power objective with the computational resources available. In this example, the set of power allocation weights can now be updated by the mapping:

$$\Omega_S: [0, +\infty)^M \to [0, +\infty)^M,$$

defined by $$\Omega_S(w) = \left(\frac{P_1 w_1}{r_1(w)}, \ldots, \frac{P_M w_M}{r_M(w)}\right)^T.$$

The iterative precoder processing method 310 may include the following process blocks of:

In process block 311, receiving at a central processing unit of a network element 106 the channel estimate matrix $G^{(l)}$ for each subcarrier $l \in S$ for the downlink channels between the MAP antennas of the one or more APs 102a-102n and the K UE antennas 105a-105k of the one or more UEs 104a-104j.

In process block 312, initializing the set of power allocation weights, w, for each of the subcarriers to an initial set of power allocation weights, $w_0 = (1, \ldots, 1)^T$ or $w_m = 1$ for all m. As described with reference to operation 216 of FIG. 2b, other initialisations may be used for the initial set of power allocation weights $w_0$. Initialise the number of iterations n=1.

In process block 313, computing the n-th updated set of power allocation weights, $w_n$, for each of the subcarriers based on $w_n = \Omega_S(w_{n-1})$. The values $r_m(w_{n-1})^2$, $1 \leq m \leq M$, are also calculated as part of this step and are retained for use in the next step.

In process block 314, determining, for each of the subcarriers, whether a stopping condition/criteria (or stopping conditions/criteria) has been reached, for example, by computing $f(w_{n-1})$ based on the values $r_m(w_{n-1})^2$ previously computed and determining if $f(w_{n-1})$ and $f(w_{n-2})$ are sufficiently close, or if $f(w_{n-1})$ is sufficiently close to the median of the values $r_m(w_{n-1})^2$, or a maximum number of iterations N is reached. If the stopping criterion/criteria is not met (e.g., No), e.g. $n \leq N$, then proceed to block 315, otherwise (e.g. Yes) proceed to block 316. Alternatively or additionally, one or more other stopping criterions may be applied as described, without limitation, for example in operation 222 of FIG. 2b.

In process block 315, increment n, i.e. n←n+1, and proceed to block 313 for computing the (n+1)-th set of power allocation weights.

In process block 316, output or return data representative of $Q^{(l)}(w_{n-1})$ for each $l \in S$. For example, this may also include selecting a precoder $Q^{(l)}(w_{n-1})$ for each $l \in S$, for $1 \leq n \leq N$ and apply the selected precoders $Q^{(l)}(w_{n-1})$ for each $l \in S$, to the communication data for transmission via one or more of the M AP antennas to the corresponding one or more of the K UE antennas of the one or more UEs 104a-104j. The advantage of selecting $Q^{(l)}(w_{n-1})$ for each $l \in S$ is because $w_{n-1}$ and/or $Q^{(l)}(w_{n-1})$ have already been calculated/computed and verified to be suitable as the stopping criterion has been met based on $w_{n-1}$ and $Q^{(l)}(w_{n-1})$. As an alternative, block 316 may be further configured to select a precoder matrix based on $Q^{(l)}(w_n)$ for each $l \in S$, as it is expected that $w_n$ and $Q^{(l)}(w_n)$ should be suitable as well, but this requires additional computation of the precoder matrix $Q^{(l)}(w_n)$ for each $l \in S$. Alternatively or as an option, block 316 may be further configured to select a precoding matrix or precoder of $Q^{(l)}(w_i)$ for each $l \in S$, where $w_i$ is the i-th set of power allocation weights for the i-th iteration, $1 \leq i \leq N$, that results in a dominant power allocation closest to a power level threshold for the plurality of AP antennas for each $l \in S$.

In process block 317, send or convey the precoded communication data to the corresponding one or more APs of the communication system for transmission via one or more of the corresponding M AP antennas of the one or more APs to the corresponding one or more UES 104a-104j. It is to be appreciated that block 317 may be modified based on transmission methods 230 or 240 of FIGS. 2c and 2d.

Process 310 may be further modified by adjusting the set of subcarriers S when iteratively calculating the power allocation weights, $w_n$. For example, in steps 311-314, a first subset of subcarriers $S_1 \subseteq S$ may be used to find the power allocation weights, $w_n$, where in step 316 a second subset of subcarriers $S_2 \subseteq S$ is used to compute the final precoder. This may reduce the complexity of the iterations in steps 313-315 by operating on $S_1$, when $S_1$ is configured to be smaller than $S_2$ and/or S. For example, $S_1=\{\text{all even subcarriers}\}$ may be used in iterations of steps 313-315, then then in step 316, a precoder for $S_2=\{\text{all subcarriers}\}$ may be computed.

Referring at least to FIGS. 3a and 3b, that, when using a zero-forcing precoder, the update functions $\Omega$ and $\Omega_S$ are invariant to scaling, in the sense that $\Omega(\alpha w)=\Omega(w)$ for any non-zero scalar value $\alpha$. Thus the algorithms or initial conditions can be modified to multiply w by a scalar factor without materially affecting the result. For example, one could include the normalization $$w_m[n] \leftarrow w_m[n]/\sum_j w_j[n]$$

for $1 \leq j \leq M$, after block 303 or 313, if desired, where $w_m[n] \in \mathbb{R}_+$ is the m-th weight of the n-th set of power allocation weights, $w_n$. This could be useful for numerical reasons such as keeping the magnitudes of the elements of w within range of a specific numerical representation.

When using a regularized zero forcing precoder, the functions $\Omega$ and $\Omega_S$ are not invariant to scaling. In this case, it is helpful to initialize each element of $w_0$ with $w_m[0]=M$ and to add the normalization $$w_m[n] \leftarrow w_m[n] * \left(\sum_j w_j[n]^{-1}\right)$$

for $$1 \leq j \leq M \left(\text{i.e. } w_m[n] \leftarrow w_m[n] * \left(\sum_j 1/w_j[n]\right)\right)$$

block 303 or 313 to ensure that each of the power allocation weights of the n-th set of power allocation weights, $w_n$, always satisfy the condition $$\sum_{m=1}^{M} w_m^{-1} = 1 \left(\text{i.e. } \sum_{m=1}^{M} w_m[n]^{-1} = 1\right).$$

This condition is motivated by Lagrangian optimization conditions for a regularized zero forcing precoder design problem. For numerical reasons, it may be beneficial to cap the maximum value of the power allocation weights, for example using the two-step normalization based on:

$$\tilde{w}_m[n] \leftarrow w_m[n] * \left(\sum_j w_j[n]^{-1}\right)$$

where C is a constant much larger than the number of AP antennas M. This two-step normalization can also be used with a zero forcing precoder.

While typically the objective $f(w_{n-1})$ decreases in each iteration of processes 300 or 310, sometimes this may not occur, thus the processes 300 and 310 (and/or processes 200 and 210 of FIGS. 2a and 2b) may be further modified to keep track of the best or optimal set of power allocation weights (denoted as weight vector $\breve{w}$ seen so far in each iteration by initializing $\breve{w}=w_0$ and by further including an additional block between blocks 303 and 304 (or blocks 313 and 314), i.e. by adding after block 303 or 312, the following block operation of: if $f(w_{n-1}) < f(\breve{w})$, then set $\breve{w} \leftarrow w_{n-1}$. Then blocks 306 or 316 may be further modified to return the precoder $Q(\breve{w})$ or $Q^{(k)}(\breve{w})$, respectively.

Figure 4A:
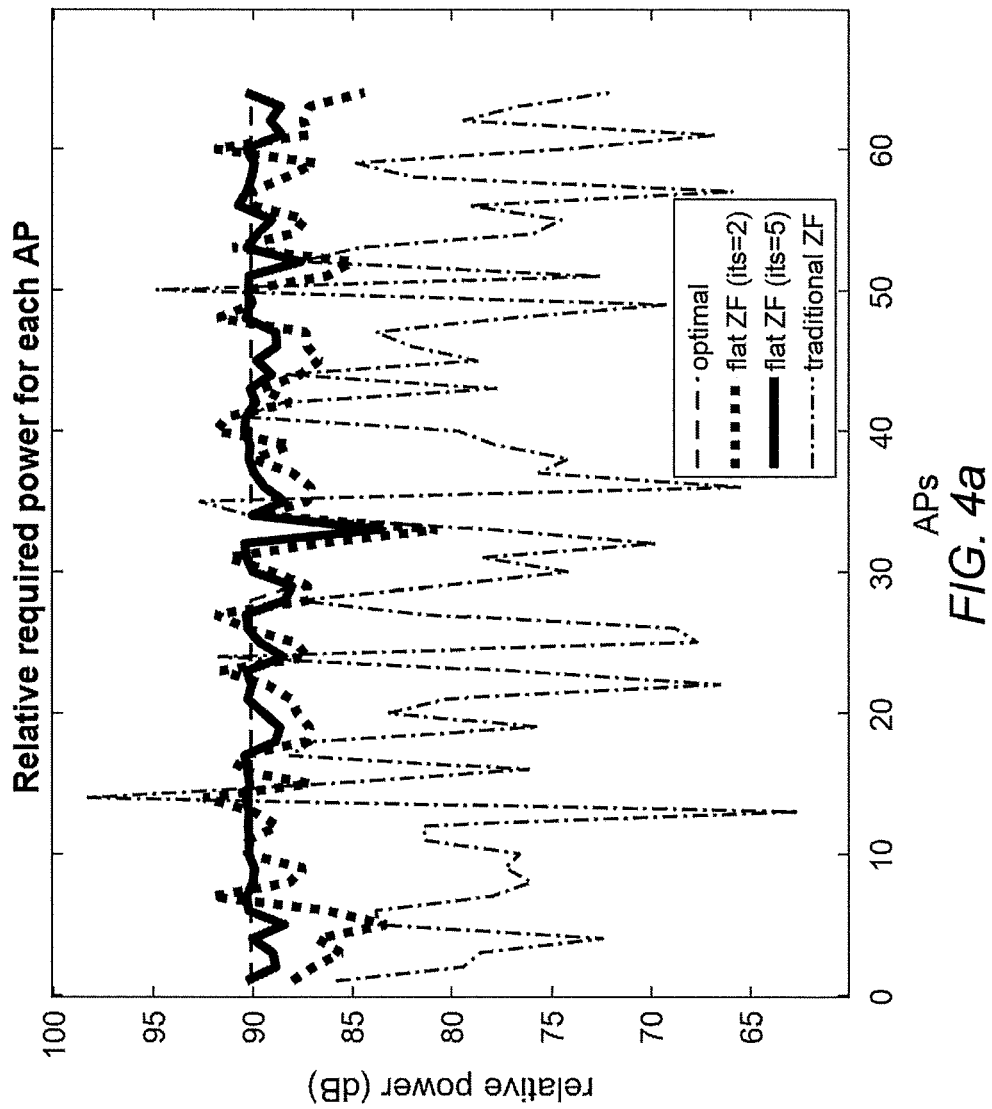
FIG. 4a is a graph illustrating the convergence of the iterative zero forcing precoder to the optimal precoder according to some example embodiments.

FIG. 4a is a graph 400 illustrating the convergence of an example iterative zero forcing precoder to the optimal precoder according to some example embodiments. This example illustrates that the per AP antenna power profile is flattened by the iterative ZF precoder generated from the iterative processing methods 200, 210, 300 and/or 310 of FIGS. 2a-3b. The graph of FIG. 4a shows the relative required transmit power for each AP antenna under different ZF precoding algorithms, for a given channel matrix G. In this example there are 64 APs in the communication system, each with a single AP antenna. The optimal ZF (dashed line) indicates that the required power is the same for most of the 64 AP, for this example the optimal ZF provides the optimal power configuration for the 64 APs. The conventional or traditional ZF (dashed-dot line) indicates the required power varies a lot from AP to AP, and hence is suboptimal compared with the optimal ZF. The iterative ZF precoder with just 2 iterations (bold dotted line) illustrates an improvement in the required power for most of the 64 APs over the traditional ZF precoder, where the worst-case power is greatly reduced. The iterative ZF precoder (generated based on processes 200, 210, 300 or 310 as described herein) with just 5 iterations (bold solid line) illustrates further improvement in the required power for most of the 64 APs over both the traditional ZF precoder and the iterative ZF precoder with 2 iterations, where near optimal power performance is achieved in relation to the optimal ZF precoder.

In a multi-user MIMO setting, one can use various objectives to measure the value of a particular network configuration. The flat ZF precoder described in this example may be advantageous for the goal of maximizing minimum SINR, a goal that emphasizes coverage and fairness.

Figure 4B:
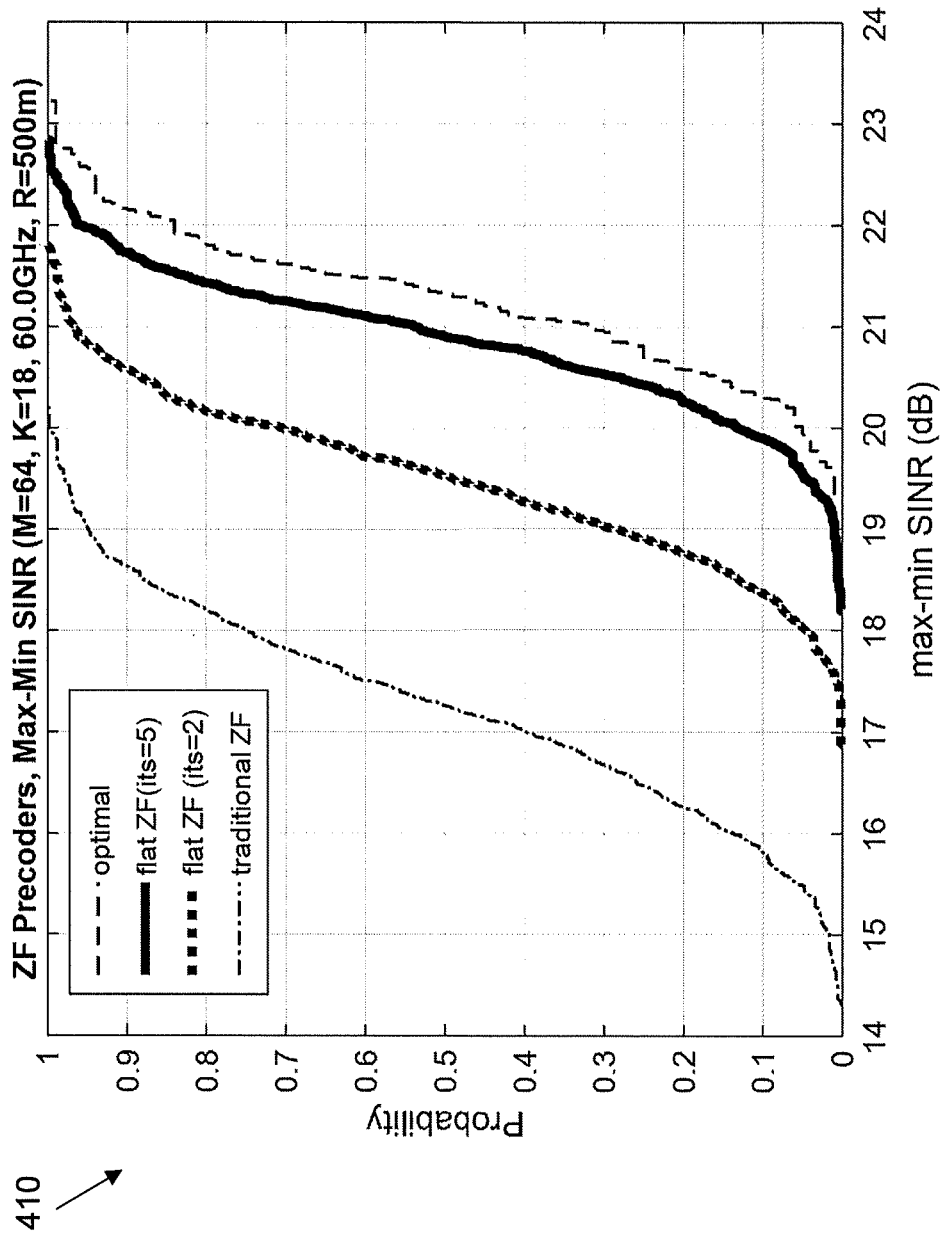
FIG. 4b is a graph illustrating the signal to interference plus noise ratio (SINR) performance of an iterative zero forcing precoder compared with optimal precoder according to some example embodiments.

FIG. 4b is a graph 410 illustrating the signal to interference plus noise ratio (SINR) performance of an iterative zero forcing precoder compared with optimal precoder according to some example embodiments. This graph 400 illustrates the results of an experiment in which, given a channel matrix and other system parameters such as transmit power constraint of each AP antenna, an iterative ZF precoder is generated/designed based on the iterative processes 200, 210, 300 and/or 310 as described herein), and then apply a max-min power control algorithm for that iterative ZF precoder, to maximize the minimum SINR achieved by any user. The cumulative distribution function (CDF) of the max-min SINR achieved is empirically estimated over many random channel matrix instances (e.g. by Monte-Carlo simulations). Graph 410 shows the CDF obtained using traditional ZF precoder, using the iterative flat ZF precoder with 2 iterations, using the iterative flat ZF precoder with 5 iterations and using a high complexity optimal linear precoder via second order cone programming. The optimal ZF precoder (dashed line) indicates the optimal SINR performance for this example. The conventional or traditional ZF (dashed-dot line) indicates very suboptimal SINR performance compared with any of the other ZF precoders. The iterative flat ZF precoder with just 2 iterations (bold dotted line) illustrates a 2.25 dB performance increase compared with the traditional ZF precoder at median. The iterative flat ZF precoder (generated based on processes 200, 210, 300 or 310 as described herein) with just 5 iterations (bold solid line) illustrates further improvement over the flat iterative ZF precoder with 2 iterations, where the iterative flat ZF precoder with 5 iterations is less than 0.5 dB at median below the SINR performance of the optimal ZF precoder (dashed line).

Figure 5:
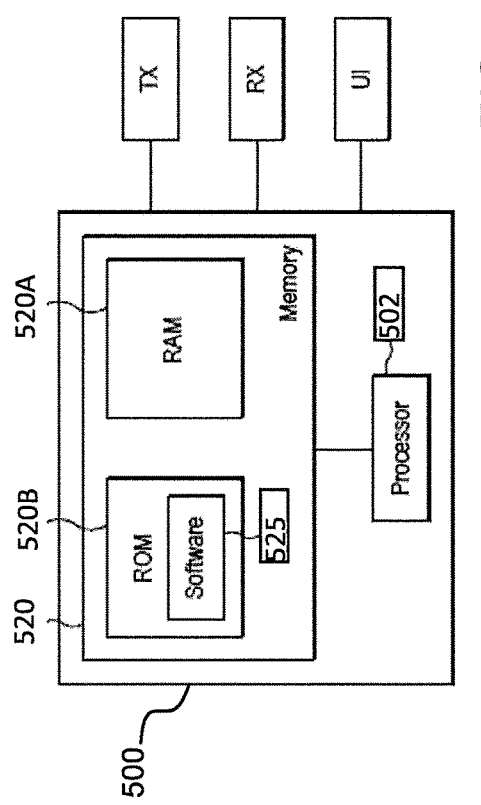
FIG. 5 is a block diagram of an apparatus which may be configured to operate in accordance with example embodiments.

FIG. 5 shows an apparatus 500 according to some example embodiments, which may be part of an access point, network node/element and/or a cloud computing platform or service and the like for implementing the systems, apparatus and/or methods as described herein. The apparatus 500 may be configured to perform the operations described herein, for example operations described with reference to any disclosed process and/or apparatus. The apparatus 500 comprises at least one processor 502 and at least one memory 520 directly or closely connected to the processor. The memory 520 includes at least one random access memory (RAM) 520*a* and at least one read-only memory (ROM) 520*b*. Computer program code (software) 525 is stored in the ROM 520*b*. The apparatus may be connected to a transmitter (TX) and a receiver (RX). The apparatus may, optionally, be connected with a user interface (UI) for instructing the apparatus and/or for outputting data. The at least one processor 502, with the at least one memory 520 and the computer program code 525 are arranged to cause the apparatus to at least perform at least the method according to any preceding process, for example as disclosed in relation to the flow diagrams or operations of any of FIGS. 1*a* to 3, combinations thereof, modifications thereto and/or related features thereof.

Figure 6:
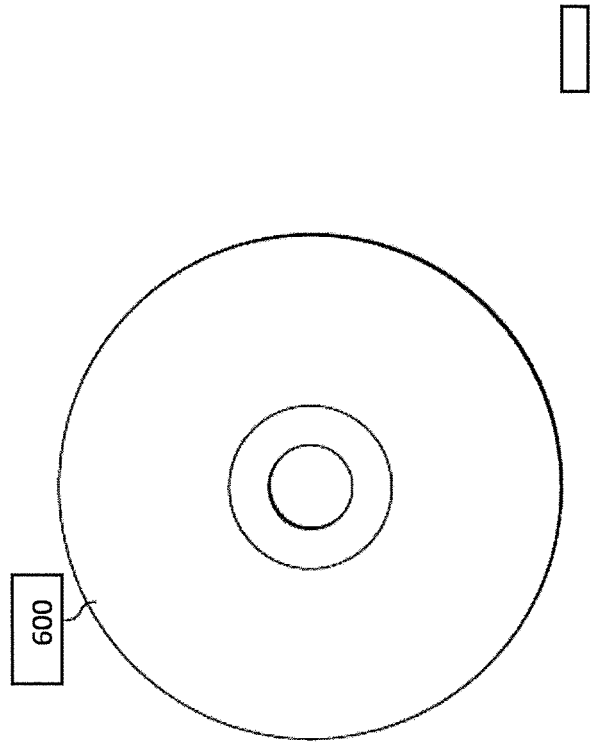
FIG. 6 is an example of a non-transitory medium on which a computer program may be stored for performing operations in accordance with example embodiments.

FIG. 6 shows a non-transitory media 600 according to some embodiments. The non-transitory media 600 is a computer readable storage medium. It may be e.g. a CD, a DVD, a USB stick, a blue ray disk, etc. The non-transitory media 600 stores computer program code, causing an apparatus to perform the method of any preceding process for example as disclosed in relation to the flow diagrams, combinations thereto, modifications thereof and/or related features thereof. The term "non-transitory," as used herein, is a limitation of the medium itself (i.e., tangible, not a signal) as opposed to a limitation on data storage persistency (e.g., RAM vs. ROM).

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G/6G and beyond networks and/or further generations of 3GPP but also in non-3GPP radio networks such as Wi-Fi.

A memory may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus, comprising:
at least one processor; and
at least one non-transitory memory storing instructions that, when executed with the at least one processor, cause the apparatus to perform at least:
receiving downlink channel estimates between a plurality of access point, antennas of one or more access points and a plurality of user equipment, antennas of one or more user equipments of a communication system;
iteratively updating a set of power allocation weights for the access point antennas using an estimated power allocation associated with the access point antennas extracted from a precoder, the precoder computed based on the received channel estimates and a previous set of power allocation weights, until a stopping criterion is reached, wherein the iteratively updating further comprises:
for the one or more iterations,
computing a precoder matrix of the precoder based on the set of power allocation weights and the received channel estimates;
extracting an estimated power allocation associated with the access point antenna from the computed precoder matrix of the precoder; and
updating the set of power allocation weights for the access point antennas based on applying the estimated power allocation associated with the access point antenna to the corresponding power allocation weight for that access point antenna from the set of power allocation weights; and
outputting data representative of a precoder computed from the received channel estimates and the updated set of power allocation weights.

2. The apparatus of claim 1, wherein the instructions, when executed with the at least one processor, cause the apparatus to perform:
applying the data representative of the output precoder for precoding communication data for transmission to one or more user equipments with one or more of the access point antennas; and
transmitting the precoded communication data to one or more corresponding access points for transmission to the one or more user equipments with the corresponding access point antennas.

3. The apparatus of claim 1, wherein the instructions, when executed with the at least one processor, cause the apparatus to perform:
  transmitting, to the access point, data representative of precoder information associated with the access point antennas of said access point extracted from the data representative of the output precoder, wherein said access point is configured to apply the corresponding precoder information for precoding communication data for transmission with the corresponding access point antennas of said access point to one or more corresponding user equipment antennas associated with one or more user equipments.

4. The apparatus of claim 1, wherein the instructions, when executed with the at least one processor, cause the apparatus to perform:
  updating, for the access point antennas, the corresponding power allocation weight of said access point antenna from the set of power allocation weights based on multiplying the corresponding power allocation weight with the inverse of the square root of the estimated power allocation of said access point antenna.

5. The apparatus of claim 1, wherein the estimated power allocation associated with the access point antenna is the square of a norm of the corresponding row of a precoder matrix of the precoder.

6. The apparatus of claim 1, wherein determining whether the stopping criterion is reached is based on at least one of:
  a maximum number of iterations is reached;
  when an improvement in a maximum estimated power allocation over the access point antennas is below a power threshold;
  determining convergence of the power allocation weight of the updated set of power allocations; or
  determining whether a difference between the power allocation weight of the updated set of power allocation weights and the corresponding power allocation weight of the previous set of power allocation weights meets one or more thresholds.

7. The apparatus of claim 1, wherein the precoder comprises at least one from the group of:
  a zero-forcing precoder;
  a regularized zero-forcing precoder;
  a minimum mean squared error precoder; or
  any other suitable multiple-input multiple-output based precoder.

8. The apparatus of claim 1, wherein the set of power allocation weights is an M dimensional vector $w=(w_1, \ldots, w_M)^T \in \mathbb{R}_+^{M \times 1}$, where M is the number of access point antennas of one or more access points, the downlink received channel estimates between the M access point antennas and a number of K user equipment antennas of one or more user equipments is represented with $G \in \mathbb{C}^{M \times K}$ and the instructions, when executed with the at least one processor, cause the apparatus to perform iteratively updating the set of power allocation weights, w, with:
  initializing the set of power allocation weights, w, to an initial set of power allocation weights, $w_0 \in \mathbb{R}_+^M$;
  for the one or more iterations, $1 \leq n \leq N$, where N is a maximum number of iterations, updating the n-th set of power allocation weights with computing $w_n = \Omega(w_{n-1})$, where:

$$\Omega(w_{n-1}) = \left( \frac{w_1[n-1]}{\|\bar{q}_1(w_{n-1})\|_2}, \ldots, \frac{w_M[n-1]}{\|\bar{q}_M(w_{n-1})\|_2} \right)^T,$$

and
  where the (n−1)-th set of power allocation weights is denoted $w_{n-1} = (w_1[n-1], \ldots, w_M[n-1])^T \in \mathbb{R}_+^{M \times 1}$, $w_m[n-1] \in \mathbb{R}_+$ is the m-th weight of the (n−1)-th set of power allocation weights, $w_{n-1}$, and the (n−1)-th extracted estimated power allocation for the m-th access point antenna is the square of $\|\bar{q}_m(w_{n-1})\|_2$, where $\bar{q}_m(w_{n-1})$ is the mth row of a precoder matrix, $Q(w_{n-1}) \in \mathbb{C}^{M \times K}$ for $1 \leq m \leq M$, which is computed based on the downlink received channel estimates, G, and the (n−1)-th set of power allocation weights, $w_{n-1}$.

9. The apparatus of claim 8, wherein outputting data representative of a precoder further comprising outputting data representative of a precoder based on at least one of:
  a precoding matrix of $Q(w_n)$, where $n \leq N$ is the final iteration;
  a precoding matrix of $Q(w_{n-1})$, where $n \leq N$ is the final iteration; or
  a precoding matrix of $Q(w_i)$, where $w_i$ is the i-th set of power allocation weights for the i-th iteration, $1 \leq i \leq N$, that results in a dominant power allocation closest to a power level threshold for the plurality of access point antennas.

10. The apparatus of claim 8, wherein the instructions, when executed with the at least one processor, cause the apparatus to perform outputting data representative of a zero-forcing precoder based on $Q(w) = WG^*(G^T WG^*)^{-1}$, where $W \in \mathbb{R}_+^{M \times M}$ is a diagonal matrix with the elements of w on the diagonal.

11. The apparatus of claim 8, wherein the instructions, when executed with the at least one processor, cause the apparatus to perform at least one of:
  initializing the set of power allocation weights, w, to an initial set of power allocation weights, $w_0 = (1, \ldots, 1)^T$ or $w_m[0] = 1$ for $1 \leq m \leq M$;
  initializing the set of power allocation weights, w, to an initial set of power allocation weights, $w_0 = [w_n]_i$, where $[w_n]_i$ is an n-th updated set of power allocation weights, $w_n$, from a previous i-th set of iterations; or
  initializing the set of power allocation weights, w, to an initial set of power allocation weights, $w_0$, where $w_m[0] = 1/\|\bar{g}_m\|_2$ for $1 \leq m \leq M$, and $\bar{g}_m$ is the m-th row of the channel matrix G.

12. The apparatus of claim 1, wherein the communication system is an orthogonal frequency division multiplexing, OFDM, system, the orthogonal frequency division multiplexing system comprising a set of subcarriers, wherein the instructions, when executed with the at least one processor, cause the apparatus to perform iteratively updating the set of power allocation weights and outputting with:
  iteratively updating the set of power allocation weights of the access point antennas for a subcarrier in the set of subcarriers using estimated power allocations extracted from a precoder computed for the subcarrier in the set of subcarriers, wherein the precoder for the subcarrier in the set of subcarriers is computed based on the received channel estimates for the subcarrier in the set of subcarriers and the previous corresponding set of power allocation weights of the access point antennas for the subcarrier in the set of subcarriers; and
  outputting data representative of a precoder for the subcarrier in the set of subcarriers, the precoder for the subcarrier in the set of subcarriers computed from the received channel estimates of the subcarrier in the set of subcarriers and the updated set of power allocation weights of the access point antenna associated with the subcarrier in the set of subcarriers.

13. The apparatus of claim 12, wherein the instructions, when executed with the at least one processor, cause the apparatus to perform computing the precoder for the first subcarrier in the set of subcarriers and the second subcarrier in the set of subcarriers, wherein the set of power allocation weights of the access point antennas for the second subcarrier are initialised based on the precoder computed for the first subcarrier in the set of subcarriers.

14. The apparatus of claim 12, wherein the instructions, when executed with the at least one processor, cause the apparatus to perform computing the precoder for the subcarriers in the set of subcarriers successively in order of increasing or decreasing subcarrier index, wherein the set of power allocation weights of the access point antennas for subcarrier index 1 is $w_n^{(l)}$ and initialising the set of power allocation weights of the access point antennas for subcarrier index 1 to $w_0^{(l)} = w_n^{(l-1)}$ when successively computing precoders for increasing subcarrier index or to $w_0^{(l)} = w_n^{(l+1)}$ when successively computing precoders for decreasing subcarrier index.

15. The apparatus of claim 1, wherein one or more of a plurality of access point antennas of the one or more access points have different power constraints, and the set of power allocation weights is an M dimensional vector $w=(w_1, \ldots, w_M)^T \in \mathbb{R}_+^{M \times 1}$, where M is the number of access point antennas, the downlink received channel estimates between the M access point antennas and a number of K user equipment antennas of one or more user equipments represented with $G \in \mathbb{C}^{M \times K}$ and the instructions, when executed with the at least one processor, cause the apparatus to perform iteratively updating the set of power allocation weights, w, with:
initializing the set of power allocation weights, w, to an initial set of power allocation weights, $w_0 \in \mathbb{R}_+^M$;
for the one or more iterations, $1 \leq n \leq N$, where N is a maximum number of iterations, updating the n-th set of power allocation weights, $w_n$, with computing $w_n = \Omega(w_{n-1})$, where:

$$\Omega(w_{n-1}) = \left( \frac{P_1 w_1[n-1]}{\|\bar{q}_1(w_{n-1})\|_2}, \ldots, \frac{P_M w_M[n-1]}{\|\bar{q}_M(w_{n-1})\|_2} \right)^T,$$

and
where the (n-1)-th set of power allocation weights is denoted $w_{n-1} = (w_1[n-1], \ldots, w_M[n-1])^T \in \mathbb{R}_+^{M \times 1}$, $w_m[n-1] \in \mathbb{R}_+$ the m-th weight of the (n-1)-th set of power allocation weights, $w_{n-1}$, $P_m^2$ is the power constraint on the m-th transmit chain, and the (n-1)-th extracted estimated power allocation for the m-th access point antenna is the square of $\|\bar{q}_m(w_{n-1})\|_2$, where $\bar{q}_m(w_{n-1})$ is the mth row of the precoder, $Q(w_{n-1}) \in \mathbb{C}^{M \times K}$ for $1 \leq m \leq M$, which is computed based on the downlink received channel estimates, G, and the (n-1)-th set of power allocation weights, $w_{n-1}$.

16. The apparatus of claim 1, wherein the communication system is an orthogonal frequency division multiplexing system with a set of subcarriers S, one or more of a plurality of access point antennas of the one or more access points have different power constraints, and the set of power allocation weights is an M dimensional vector $w=(w_1, \ldots, w_M)^T \in \mathbb{R}_+^M$, where M is the number of access point antennas of the one or more access points, the downlink received channel estimates for the subcarrier $l \in S$ between the M access point antennas and a number of K user equipment antennas of one or more user equipments is represented with $G^{(l)} \in \mathbb{C}^{M \times K}$, and wherein the instructions, when executed with the at least one processor, cause the apparatus to perform iteratively updating the set of power allocation weights, w, comprising with:
initializing the set of power allocation weights, w, to an initial set of power allocation weights, $w_0 \in \mathbb{R}_+^M$;
for the one or more iterations, $1 \leq n \leq N$, where N is a maximum number of iterations, updating the n-th set of power allocation weights, $w_n$, with computing $w_n = \Omega_S(w_{n-1})$, where:

$$\Omega_S(w_{n-1}) = \left( \frac{P_1 w_1[n-1]}{r_1(w_{n-1})}, \ldots, \frac{P_M w_M[n-1]}{r_M(w_{n-1})} \right)^T,$$

and
where the (n-1)-th set of power allocation weights are denoted $w_{n-1} = (w_1[n-1], \ldots, w_M[n-1])^T \in \mathbb{R}_+^{M \times 1}$, $w_M[n-1] \in \mathbb{R}_+$ the m-th weight of the (n-1)-th set of power allocation weights, $w_{n-1}$, $P_m^2$ is the power constraint on the m-th transmit chain, and $$r_m(w_{n-1}) = \sqrt{\sum_{l \in S} \|\bar{q}_m^{(l)}(w_{n-1})\|_2^2}$$

is the square root of the total transmit power for access point antenna m incorporating contributions for all subcarriers $l \in S$, where $\bar{q}_m^{(l)}(w_{n-1})$ is the mth row of the precoder matrix for subcarrier $l \in S, Q^{(l)}(w)$; and
outputting for the subcarriers in the set of subcarriers data representative of a precoder matrix based on $Q^{(l)}(w_n)$ or $Q^{(l)}(w_{n-1})$ for $l \in S$.

17. The apparatus of claim 1, wherein:
the plurality of access point antennas of the one or more access points are part of a cell-free massive multi-input multiple-output communication network; or
the plurality of access point antennas of the one or more access points are part of a cellular communication network.

18. A computer-implemented method, comprising:
receiving downlink channel estimates between a plurality of access point antennas of one or more access points and a plurality of user equipment antennas of one or more user equipments of a communication system;
iteratively updating a set of power allocation weights for the access point antennas using an estimated power allocation associated with the access point antennas extracted from a precoder, the precoder computed based on the received channel estimates and a previous set of power allocation weights, until a stopping criterion is reached, wherein the iteratively updating further comprises;
for the one or more iterations,
computing a precoder matrix of the precoder based on the set of power allocation weights and the received channel estimates;
extracting an estimated power allocation associated with the access point antenna from the computed precoder matrix of the precoder; and
updating the set of power allocation weights for the access point antennas based on applying the estimated power allocation associated with the access point antenna to the corresponding power allocation weight for that access point antenna from the set of power allocation weights; and outputting data representative of a precoder computed from the received channel estimates and the updated set of power allocation weights.

* * * * *